US008607911B2

(12) United States Patent
Tsujimoto et al.

(10) Patent No.: US 8,607,911 B2
(45) Date of Patent: Dec. 17, 2013

(54) MOVING SHELF EQUIPMENT

(75) Inventors: Kazushi Tsujimoto, Shiga (JP); Natsuo Takagawa, Shiga (JP); Syouji Yokoyama, Shiga (JP)

(73) Assignee: Daifuku Co., Ltd. (JP)

( * ) Notice: Subject to any disclaimer, the term of this patent is extended or adjusted under 35 U.S.C. 154(b) by 147 days.

(21) Appl. No.: 13/257,914

(22) PCT Filed: Mar. 27, 2009

(86) PCT No.: PCT/JP2009/001418
§ 371 (c)(1),
(2), (4) Date: Sep. 20, 2011

(87) PCT Pub. No.: WO2010/109543
PCT Pub. Date: Sep. 30, 2010

(65) Prior Publication Data
US 2012/0006765 A1  Jan. 12, 2012

(51) Int. Cl.
*A47B 53/00* (2006.01)
(52) U.S. Cl.
USPC .......................................... 180/167; 211/1.57
(58) Field of Classification Search
USPC .................. 180/167, 168, 169, 6.2, 6.48, 6.5;
414/266, 267, 281, 331.01, 331.06,
414/807; 211/1.51, 1.57, 162; 312/198, 201
See application file for complete search history.

(56) References Cited

U.S. PATENT DOCUMENTS

| 4,039,040 A * | 8/1977 | Spears et al. ................. 104/288 |
| 4,424,875 A * | 1/1984 | Yoshida ......................... 180/168 |
| 4,847,774 A * | 7/1989 | Tomikawa et al. ............... 701/23 |
| 5,333,983 A * | 8/1994 | Hatouchi et al. ......... 414/331.06 |
| 6,845,834 B2 | 1/2005 | Hatanaka |
| 7,032,762 B2 * | 4/2006 | Miyazaki et al. ............. 211/162 |
| 2002/0131849 A1 | 9/2002 | Hatanaka |
| 2006/0235615 A1 | 10/2006 | Kato et al. |

FOREIGN PATENT DOCUMENTS

| CN | 1616323 | 5/2005 |
| JP | 3002910 A | 1/1991 |
| JP | 9325816 A | 12/1997 |
| JP | 10215958 A | 8/1998 |

(Continued)

OTHER PUBLICATIONS

International Search Report for PCT/JP2009/001418, English translation attached to original, Both Completed by the Japanese Patent Office on Jul. 24, 2009, All together 4 Pages.

(Continued)

*Primary Examiner* — John Walters
*Assistant Examiner* — Brian Swenson
(74) *Attorney, Agent, or Firm* — Brooks Kushman P.C.

(57) ABSTRACT

A movable rack system able to carry out a widthwise shift control of a movable rack without using a sheet rail member to be detected. The system is so configured, that magnets are placed at stop positions of the movable rack on the floor surface as members to be detected, while the movable rack is equipped with magnetic sensors to detect the magnets. When the movable rack stops traveling, the magnetic sensors detect the magnets and compares the detected magnetic intensity to the magnetic intensity detected at the previous stop. If the change exceeds a pre-determined value, namely the widthwise shift exceeding a pre-determined value is detected, a travel route of the movable rack to eliminate the widthwise shift is determined. In the next travel of the movable rack the rotation speeds of the respective driving motors are controlled so that the movable rack follows the travel route.

7 Claims, 17 Drawing Sheets

(56) References Cited

FOREIGN PATENT DOCUMENTS

| | | |
|---|---|---|
| JP | 2002087518 A | 3/2002 |
| JP | 3804462 B2 | 8/2006 |
| JP | 2007107305 A | 4/2007 |

OTHER PUBLICATIONS

Chinese Office Action and Search Report for CN 200980157842.5, Dated Mar. 4, 2013, 6 Pages.

\* cited by examiner

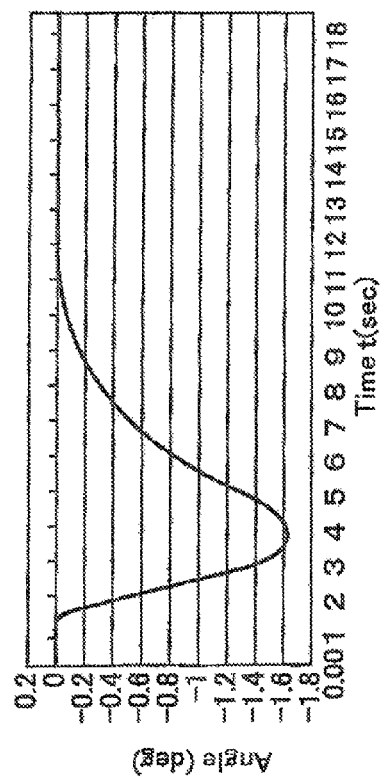
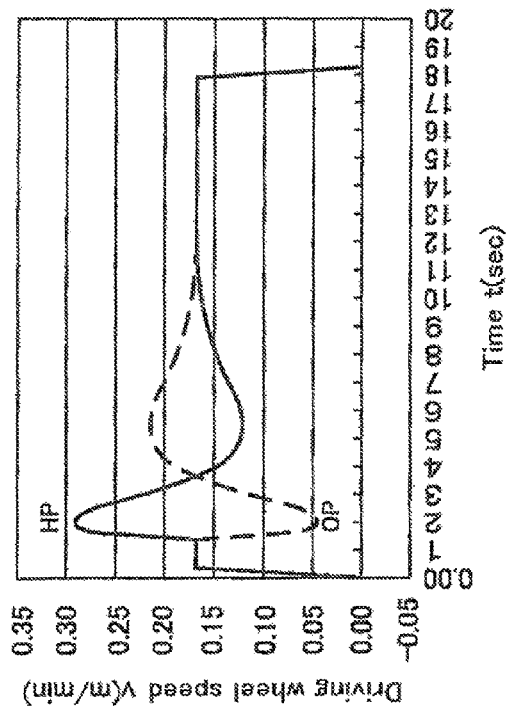
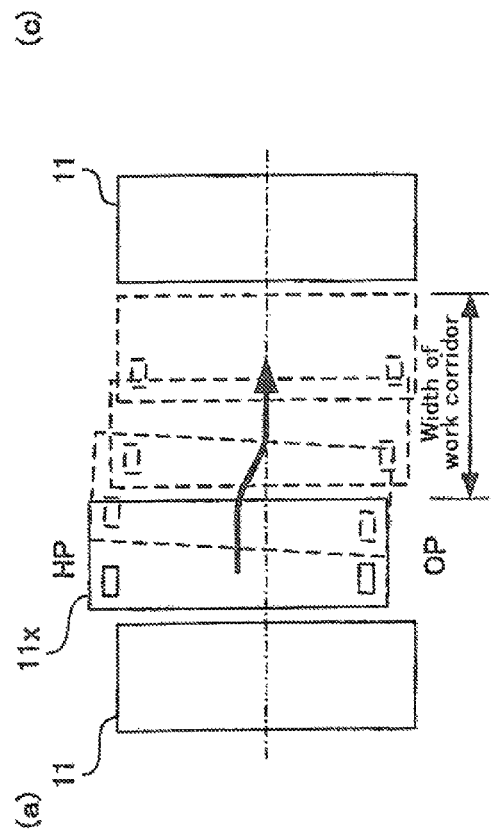
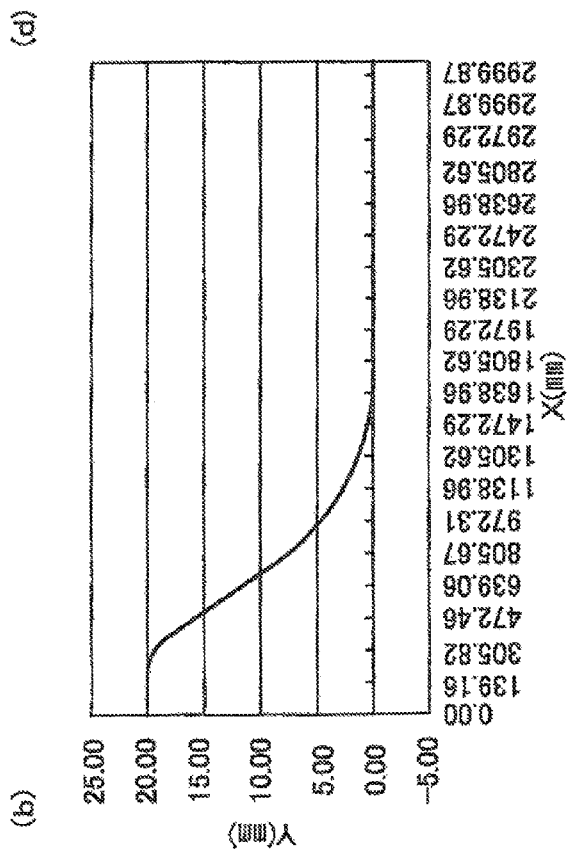
Fig. 17

MOVING SHELF EQUIPMENT

CROSS-REFERENCE TO RELATED APPLICATION

This application is the U.S. national phase of PCT Appln. No. PCT/JP2009/001418 filed Mar. 27, 2009, the disclosure of which is incorporated in its entirety by reference herein.

BACKGROUND OF THE INVENTION

1. Field of the Invention

The present invention relates to a movable rack system to be installed in a narrowly limited space, for example in a warehouse, namely a movable rack system having a plurality of movable racks that can travel freely back and forth on a travel path by means of wheels. Especially it relates to a movable rack system allowing movable racks to travel freely back and forth without being guided by a rail (in a trackless manner).

2. Description of the Related Art

An example of a conventional movable rack system allowing free reciprocating trackless traveling is disclosed in Patent Literature 1.

More particularly, such a system is disclosed, where a plurality of movable racks that can travel freely back and forth on a travel path (in a trackless manner) by means of wheels are disposed between stationary racks, so that a corridor is opened up between the adjacent stationary rack and a movable rack or between adjacent movable racks by the travels of the movable racks, and goods are delivered to/from the stationary rack or the movable rack, which face the corridor, therethrough Wheels located at both sides of each movable rack in the left and right direction, which is perpendicular to the extending direction of the travel path, are respectively provided with driving motors to constitute driven travel wheels. Further, pulse encoders are disposed at both the sides and a movable rack controller is also provided to control the drive rotation amount of both the driving motors, respectively.

The movable rack controller counts pulses of the respective pulse encoders to determine the travel distances of the respective driven travel wheels at both the sides, determines the deviation and the change rates of the travel distances, and controls the speeds of the respective driving motors (the drive rotation amount) so as to eliminate the deviation of the predictive travel distances predicted from the deviation and the change rates of the travel distances, so that the attitude of the movable rack is maintained without being skewed during the travel (execution of attitude control).

In this manner, the attitude control is executed by the movable rack controller during the reciprocating travels of the movable rack along the travel path, so that skewing of the movable rack during the travel and narrowing of the corridor to disturb the goods delivery can be prevented even in the trackless condition.

Further, a sheet rail member to be detected is laid on the floor surface along the travel path, and a widthwise shift detecting means is equipped to detect a deviation in the left and right direction (a widthwise shift) of the movable rack by detecting the member. When the detected widthwise shift exceeds a pre-determined value, the movable rack controller controls the speeds (drive rotation amount) of the respective driving motors to eliminate the widthwise shift, so that the movable rack does not deviate in the left and right direction (execution of widthwise shift control).

[Patent Literature 1] JP3804462B

DISCLOSURE OF THE INVENTION

Problems to be Solved by the Invention

As described above, in the conventional movable rack system a sheet rail member to be detected is used to eliminate the widthwise shift, however, it is troublesome to construct such a sheet rail member along a definite lane keeping it horizontally on the floor surface. Further, since the sheet rail member to be detected is exposed on the corridor surface in the place where the corridor is formed, it must be guarded against damages caused by treading by workers or a service vehicle for delivering goods, but such robust construction is difficult to form.

Under such circumstances, the present invention has for its object to provide a movable rack system, where the widthwise shift control of the movable rack can be conducted without using a sheet rail member to be detected.

SUMMARY OF THE INVENTION

In order to carry out the object, the invention according to claim 1 of the present application is a movable rack system, which comprises a plurality of movable racks that can travel freely back and forth on a travel path by means of wheels, among which the wheels located at both sides in the transverse direction of the travel path are respectively provided with driving motors to constitute driven travel wheels, and a control means for controlling a travel of the movable rack by driving the respective driving motors of the movable rack, the system comprising; members to be detected being provided on a floor surface at stop positions of the respective movable racks; and widthwise shift detection means being provided on the respective movable racks for detecting a widthwise shift of the movable rack from the travel path in the left and right direction perpendicular to the extending direction of the travel path by detecting the members to be detected; wherein the control means detects the widthwise shift by the widthwise shift detection means when the rack stops to travel, and wherein when a detected widthwise shift exceeding a pre-determined value is detected, the control means determines a travel route for the movable rack to reduce the widthwise shift and controls rotation speeds of the respective driving motors so that the rack follows the travel route at the next travel thereof.

According to the above construction, the members to be detected are detected when the movable rack stops to travel, and when the detected widthwise shift exceeds the pre-determined value, a travel route for the movable rack is determined so as to reduce the widthwise shift, and the rotation speeds of the respective driving motors are controlled to correct the widthwise shift of the rack so that the rack follows the travel route at the next travel. In this case, a travel route to reduce the widthwise shift is determined, and the rotation speeds of both the driving motors are controlled so that the rack traces the travel route without light reflective tape or magnetic tape along the travel path as in the conventional art. Thus, the widthwise shift control for the movable rack can be conducted without using a sheet rail member to be detected, and therefore it is not required to lay down such any sheet rail member to be detected.

Further, in the invention according to claim 2 depending upon claim 1, the control means controls the system such that when a movable rack travels according to the travel route reducing the widthwise shift, another movable rack starts to travel with a delay of a pre-determined time period.

According to the above construction, in case a movable rack travels eliminating the widthwise shift, another movable rack starts to travel being delayed for a pre-determined time period. This can prevent a possible collision between the backward edge of the skewed movable rack and the following movable rack, when the first movable rack turns toward the direction, to which the widthwise shift should be corrected, continuing the travel for eliminating the widthwise shift.

Further, in the invention according to claim 3 depending upon claim 1 or 2, the travel route is so configured that both the driving motors are initiated with above a pre-determined rotation speed and driven thereafter at differentiated rotation speeds to eliminate the widthwise shift by a travel of the rack over a pre-determined distance.

According to the above construction, both the driving motors are initiated with above a pre-determined rotation speed and driven thereafter at differentiated rotation speeds, and the widthwise shift of the movable rack is eliminated by the travel of the rack over a pre-determined distance. Since both the driving motors are initiated with above a pre-determined rotation speed, when one wheel is stopped and the other wheel is moved about the one, such a phenomenon can be avoided that the one wheel is dragged to move uncontrollably.

Further, in the invention according to claim 4 depending upon claim 1 or 2, the travel route is so configured that both the driving motors are initiated with above a pre-determined rotation speed and driven thereafter at differentiated rotation speeds to eliminate the widthwise shift by plural travels of the movable rack.

According to the above construction, both the driving motors are initiated with above a pre-determined rotation speed and driven thereafter at differentiated rotation speeds, and the widthwise shift of the movable rack is eliminated during the plurality of travels of the rack.

Further, in the invention according to claim 5 depending upon any one of claims 1 to 4, the control means determines the frequency or the number of executions of the travels reducing the widthwise shift, and when the frequency exceeds a pre-determined frequency, or if the number exceeds a pre-determined number the control means issues an alarm.

According to the above construction, if the frequency or the number of the executions of the widthwise shift of the movable rack increases, an alarm is issued to notice the occurrence of the widthwise shift of the movable rack.

Further, in the invention according to claim 6 depending upon any one of claims 1 to 5, magnets are disposed as the members to be detected at respective forward and backward stop positions of the respective movable racks that move along the travel path and stop there; while magnetic sensors are equipped so as to face the magnets as the widthwise shift detection means; and when the movable rack stop to travel, the control means detects the widthwise shift of the movable rack from the change between the magnetic intensity currently detected by the magnetic sensors and the magnetic intensity previously detected by the magnetic sensors, and executes the travel control for the movable rack to reduce the widthwise shift thereof.

According to the above construction, the widthwise shift of the movable rack is detected by comparing the magnetic intensities of the magnets disposed at respective forward and backward stop positions of the rack, which are detected by the magnetic sensors, and the travel of the movable rack is controlled to reduce the detected widthwise shift of the movable rack. By the dispositions of the magnets at the respective stop positions of the movable racks, it becomes not necessary to construct any sheet rail member to be detected.

Further, the invention according to claim 7 depending upon any one of claims 1 to 6, the respective movable racks are equipped with a travel distance measuring means for detecting travel distances of the respective driven travel wheels at both the sides; and the control means performs an attitude correction control for the movable rack by controlling the driving rotation amount of the respective driving motors to eliminate the deviation in the travel distances of both the driven travel wheels based on the travel distances of the driven travel wheels detected by the travel distance measuring means.

According to the above construction, the control means of the movable rack controls the rotation amount of the respective driving motors so as to eliminate the deviation between the travel distances of both the driven travel wheels based on the travel distances of the driven travel wheels, which are detected by the two travel distance measuring means at both the sides, and thus a travel of the movable rack is controlled to prevent a skewed attitude thereof.

Advantages of the Invention

According to the movable rack system of the present invention, the widthwise shift of the movable rack can be corrected by such an arrangement that when the widthwise shift exceeds a pre-determined value at a time when the movable rack stops to travel, a travel route for the movable rack is determined to reduce the widthwise shift, and the rotation speeds of the respective driving motors are controlled so that the movable rack follows the travel route at the next travel thereof. Consequently, it becomes not necessary to construct a light reflective tape or a magnetic tape along the travel path, and therefore, any inconveniences associated with the construction thereof can be advantageously eliminated.

DETAILED DESCRIPTION OF THE PREFERRED EMBODIMENT

An embodiment of the present invention will be described with reference to the accompanied figures.

As shown in FIGS. 1 and 3, the movable rack system of the embodiment is configured of six movable racks 11 (an example of a plurality of racks) and stationary racks 3 disposed outward at both the ends of a travel path 10 for the group of the movable racks 11. The 6 movable racks 11 are installed between the pair of the stationary racks 3 movable freely back and forth along the travel path direction A, and a work corridor S is formed between the movable racks 11 or between the movable rack 11 and the stationary rack 3 for delivery of goods to/from a movable rack 11 or a stationary rack 3. In the embodiment, the width of the work corridor S in the travel path direction A is identical with the width of a movable rack 11 in the travel path direction A.

Hereinafter, the direction perpendicular to the travel path direction A (the forward-backward direction) of the movable racks 11 is referred as a transverse direction B (the left and right direction). When one of the sides of the movable rack 11, on which a control panel 20 (details described below) is provided, is determined as a front side, the right direction is referred as a forward direction (FW) and the movement to the right side as an advancing direction; and the left direction is referred as a backward direction (RE) and the moving direction to the left side as a retreating direction. Further, one of the sides (the back side) of the movable rack 11 in the transverse direction B (the left and right direction) is referred as HP side, and the other side (the front side) in the transverse direction B as OP side. Furthermore, at the position that the movable rack 11 travels and stops to form the work corridor S, the backward stop position is referred as an RV stop position and the forward stop position as an FW stop position (Stationary Rack)

The stationary rack 3 is constituted of a lower frame unit 4, which is mounted and fixed on the floor surface 1a, and a rack unit 5 mounted on the lower frame unit 4. In the rack unit 5 are formed a plurality of storage compartments 5a both in horizontal and vertical directions.

Between the lower portions of both the stationary racks 5 are provided photoelectric sensors 6 for detecting an obstacle. A plurality of the photoelectric sensors 6 is arranged with appropriate intervals in the transverse direction B. The photoelectric sensor 6 is a transmission type photoelectric switch constituted of a light emitter 7 and a light receiver 8 aligned facing each other, and they are arranged such that a detection beam 7a from each light emitter 7 passes through the space between the bottom surface of lower frame unit 12 (described below) in the group of the movable racks 11 and the floor surface 1a, to be received by a light receiver 8 at the opposite position.

By installing a pair of stationary racks 3, goods can be stored utilizing the facility space at high efficiency. Further, by using the photoelectric sensors 6, if the movable rack 11 is attempted to move while a worker is within the work corridor S, the worker can be detected by the detection beam 7a crossing the work corridor S, and the movement of the movable rack 11 can be controlled to stop. Furthermore, since the detection beam 7a is set at a lower level from the floor surface 1a, not only the worker but also a small foreign substance, which may fall down from a rack unit 5 of a stationary rack 3 or a rack unit 13 of the movable rack 11 (described below) onto the work corridor S, can be detected in a non-physically contacted manner.

As such a foreign substance detection method, photoelectric sensors may be arranged at the front and back sides of the movable rack 11 so that the detection beams are directed in the transverse direction B, or contact bumpers may be provided at the lower portions of both the forward and backward surfaces of the movable rack 11.

(Movable Rack)

As shown in FIGS. 1 to 7, a plurality of the movable racks 11 are installed so that they can travel back and forth freely by means of travel wheels 14 (an example of travel support devices; wheels) on the travel path 10. The movable rack 11 is configured with a lower frame unit 12 and a rack unit 13 mounted thereon.

The lower frame unit 12 is configured in the form of a rectangular frame with lateral lower frames 12a located at both the ends thereof in the transverse direction B (left and right direction), intermediate lower frames 12b arranged at 5 locations (plural locations) inside thereof, connecting members 12c connecting the lateral lower frames 12a and the intermediate lower frames 12b in the transverse direction B (left and right direction), longitudinal connecting members 12d placed at a plurality of positions between the connecting members 12c in the fore and aft direction, and a plurality of braces 12e.

The lateral lower frame 12a and the intermediate lower frame 12b are respectively configured of a pair of side plates and a top plate being connected to the upper edges of the side plates to form a portal frame which opens downward. The connecting member 12c and the longitudinal connecting member 12d are tubular members with a rectangular cross-section.

The rack unit 13 is configured with trusses 13a, beams 13b, subbeams 13c and braces 13d erected on the lateral lower frame 12a and the intermediate lower frame 12b to form a framework. Therefore, a plurality of storage compartments 13e, which open to the travel direction A, are formed in the vertical direction as well as in the transverse direction B. The uppermost storage compartments 13e are also open upward.

(Wheel)

In the lateral lower frame 12a and the intermediate lower frame 12b, a pair of front and backward travel wheels 14 are mounted by means of wheel shafts 15, respectively. The travel wheel 14 is configured with an inner wheel 14a made of a metal and an outer wheel 14b made of a hard urethane rubber, and rolls on freely over a floor surface 1a of the floor 1 made of, for example, concrete by means of the outer wheel 14b. In short, the travel wheels 14 are provided at 7 positions (plural positions) in the transverse direction B and 2 positions (plural positions) in the travel direction A, respectively.

The travel wheels 14 located at both the sides in the transverse direction B of the travel path 10 are configured as driven travel wheels 14A (driven travel support devices) provided with rotation drive means, respectively. Namely, among the travel wheels 14 group supported by the lateral lower frame 12a at the sides of the travel path 10 in the transverse direction B, at least one travel wheel 14 situated at one of the sides in the travel direction A (at least one) is mounted on the drive wheel shaft 15A to constitute a driven travel wheel 14A.

In this case, the driven travel wheels 14A mounted at both the sides in the transverse direction B are provided at 2 positions being straight and opposite each other in the transverse direction B with respect to the lower frame unit 2 of the rectangular frame. Further, the drive wheel shaft 15A extends inward in the transverse direction B, to the innermost end of which a travel wheel supported by the adjacent intermediate lower frame 12b is connected. Then the travel wheel also constitutes a driven travel wheel 14A. To both the drive wheel shafts 15A, are coupled induction driving motors 16 (an example of rotation drive means) having reduction gears, respectively. The driving motors 16 are mounted on the intermediate lower frames 12b.

At the higher level of the forward and backward ends of the lateral lower frame, there are provided cylindrical stoppers 17 made of rubber.

The above-mentioned items 12 to 17, etc. constitute a movable rack 11 that is freely movable reciprocatingly on the travel path 10.

(Pulse Encoder)

On the movable rack 11, pulse encoders 21 (an example of travel amount detection means) are installed near the inner driven travel wheel 14A (supporting/driving device) on the sides in the transverse direction B, respectively, and the pulse encoders 21 are connected to a control panel 20 mounted on the side surface of the movable rack 11.

That is to say, the pulse encoder 21 is constituted of: a supporting frame 24, which is swingable up and down about a transverse axis 23 along the transverse direction B, provided on a bracket 22 extended from the lower frame unit 12; a detection wheel unit 27 whose wheel unit shaft 26 is supported through bearings 25 freely rotatably on the supporting frame 24; a rotating unit 28 mounted on the wheel unit shaft 26; a photoelectric switch 29 mounted on the supporting frame 24 side facing slits 28a and 28b formed on the rotating unit 28, etc.

Note that, on the rotating body 28, concave outer slits 28a and square-hole like inner slits 28b are formed at predetermined angle intervals, while the outer slits 28a and the inner slits 28b are staggered relatively in the circumferential direction by half of the predetermined angle interval. Furthermore, the photoelectric switch 29 is composed of an outer photoelectric switch 29a facing the outer slit 28a and an inner photoelectric switch 29b facing the inner slit 28b. Both the photoelectric switches 29a and 29b are connected to the control panel 20.

The pressure contact of the detection wheel unit 27 to the floor surface 1a is realized by descent of the supporting frame 24 by its own weight. However, any biasing means, such as helical compression spring or leaf spring, may be used to make the supporting frame 24 descend downward.

The items 22 to 29, etc. mentioned above constitutes an example of the pulse encoder 21.

(Widthwise Shift Detection)

In the floor 1, round shaped magnets 31 (an example of members to be detected) are buried on each HP side and OP side to indicate the RV stop position, as well as additional round shaped magnets 31 (an example of members to be detected) are buried being shifted in the travel direction A (fore and aft direction) on each HP side and OP to indicate the FW stop position. Each movable rack 11 is equipped with magnetic sensors 35 as a widthwise shift detection means to know the widthwise shift of the movable rack 11 by detecting the magnets 31 at an HP position and an OP position. That is to say, to a pair of the connecting members 12c in the central portion is fixed a bracket 36 that approaches the floor 1 in the transverse direction B and the bracket carries three magnetic sensors 35a (HP side), 35b (center), and 35c (OP side) in the transverse direction B (left and right direction). Out of the magnetic sensors 35a, 35b and 35c, the central magnetic sensor 35b is so positioned to face the magnet 31 upward when the movable rack 11 is not deviated in the transverse direction B. The 2 sets of the magnetic sensors 35a, 35b and 35c are connected to the control panel 20.

(Approach Detection)

To the forward and backward surfaces of the lower frame unit 12 of the movable rack 11 are provided with an proximity sensor 37a for detecting the approach of the forward side adjacent movable rack 11 and an proximity sensor 37b for detecting the approach of the backward side adjacent movable rack 11. The proximity sensors 37a and 37b are connected to the control panel 20. The proximity sensors 37a and 37b may be magnetic sensors, reflective photoelectric switches, or ultrasonic sensor.

(Main Control Panel)

The control panel 20 installed on each of the movable rack 11 is connected to a main control panel 38. The main control panel 38 is for controlling the entire movable rack system, equipped with an ON/OFF switch for the movable rack system, an operating unit (buttons) for each movable rack 11, etc. By operating the unit, a travel direction signal is given to the control panel 20 of the movable rack 11 to be moved as a travel command. For example, to have the movable rack 11 standing at the stop position P5 in FIGS. 1 to 3 travel on the travel path 10 and then stop at the stop position P6, the main control panel 40 is manipulated so that the travel command signal (travel direction signal) is given to the control panel 20 of the movable rack 11 standing at the stop position P5.

The main control panel 38 is so configured that, in case a plurality of the movable racks 11 are moved simultaneously, it can control them to start one-by-one at a predetermined time intervals (2 to 3 sec). Furthermore, when giving the travel direction signal, which requires widthwise shift control in the traveling direction as will be described below, a widthwise shift control signal indicating the presence of the movable rack to be controlled is given.

(Control Panel on Movable Rack)

As shown in FIG. 11, in the control panel 20 of each movable rack 11 are provided an operation panel 40 (FIG. 9), a movable rack controller 41 (an example of the control means) composed of a computer, and vector control inverters 42a and 42b for controlling the respective torque vectors of the driving motors 16 disposed along the transverse direction B (left and right direction) according to the commanded speed value output from the movable rack controller 41; and on the surface of the control panel 20 of each movable rack 11 are provided an alarm lamp 43 that lights up when a deviation in the transverse direction B (herein referred to as "widthwise shift") is not eliminated automatically, and a caution lamp 44 that lights up when the widthwise shift occurs frequently with a movable rack 11. The vector control inverters 42a and 42b are so configured that the output can be calculated with a high speed computing units (CPU) in accordance with the then prevailing loads, the voltage/current vectors can be optimally controlled, and the starting torques are increased. By controlling the torque vectors using the vector control inverters 42a and 42b, rotational driving influenced little by load fluctuation can be conducted, minimizing an oblique movement caused by the imbalance in the load distribution of the stored goods in the movable rack 11.

(Operation Panel)

In case a movable rack 11 deviates in the transverse direction B, the movable rack controller 41 carries out a correction control to eliminate the widthwise shift (widthwise shift control), automatically (more particulars will be described below). However, a manual operation panel 40 is also provided, just in case such correction control be not started. As shown in FIG. 9, the operation panel 40 provides:

an automated/forced selection switch 51 for selecting an automated operation of the movable rack 11 or a forced travel thereof with the aid of the switches described below;

an HP turn switch 52 (a switch for operating one of the driven travel wheels 14A manually) to activate the driving motor 16 connected to the driven travel wheel 14A on the HP side such that the driven travel wheel 14A is driven to the direction to which the switch is tilted;

an OP turn switch 53 (a switch for operating the other driven travel wheel 14A manually) to activate the driving motor 16 connected to the driven travel wheel 14A on the OP side such that the driven travel wheel 14A is driven to the direction to which the switch is tilted;

an HP shift button switch 54 (an example of a 1st switch to start a semi-automatic correction by a predetermined distance to the HP side) for sending a command to shift the movable rack 11 to the HP side in the transverse direction (left and right direction) by a predetermined width (e.g. 10 mm); and an OP shift button switch 55 (an example of a 2nd switch to start a semi-automatic correction by a predetermined distance to the OP side) for sending a command to shift the movable rack 11 to the OP side in the transverse direction (left and right direction) by a predetermined width (e.g. 10 mm).

(Movable Rack Controller 41)

As shown in FIG. 11, to the movable rack controller 41 are connected the main control panel 38, the operation panel 40, the HP and OP pulse encoders 21 (photoelectric switches 29a and 29b), the HP and OP magnetic sensors 35a, 35b and 35c, the forward and backward proximity sensors 37a and 37b, the HP and OP vector control inverters 42a and 42b, the alarm lamp 43 and the caution lamp 44. And, the movable rack controller 41 comprises:

a forced travel control unit 61 (more details will be described below);

an HP magnetic intensity detection unit 62a, where the magnetic intensities detected by the respective HP magnetic sensors 35a, 35b and 35c are summed up to determine the magnetic intensity at the HP side, and the magnetic intensities at the HP side detected by the magnetic sensor 35a and those at the OP side detected by the magnetic sensor 35c are compared to know the direction of the widthwise shift of the movable rack 11 (deviated to the HP side or to the OP side);

an OP magnetic intensity detection unit 62b, where the magnetic intensities detected by the respective OP magnetic sensors 35a, 35b and 35c are summed up to determine the magnetic intensity at the OP side;

an automated travel judgment unit 63 (more details will be described below);

a travel reset unit 64 where a travel start pulse signal is output when a travel command from the automated travel judgment unit 63 is switched to an advancing command or a retreating command;

a first counter 65 that is reset when a reset signal (as will be described below) is input and the advancing command is output from the automated travel judgment unit 63, where pulses output from the left pulse encoder 21 is counted and then the travel distance per pulse (which has been learned beforehand) is multiplied to obtain the travel distance of the left driven travel wheel 14A (an example of the travel amount);

a second counter 66 that is reset when a reset signal (as will be described below) is input and the advancing command is output from the automated travel judgment unit 63, where pulses output from the right pulse encoder 21 is counted and the travel distance per pulse (which has been learned beforehand) is multiplied to obtain the travel distance of the right driven travel wheel 14A (an example of the travel amount);

a pulse error judgment unit 67 that is reset by a travel start pulse signal output from the travel reset unit 64, where pulses output respectively from the left and right pulse encoders 21 is counted to detect the difference in the two pulse numbers; and when the difference exceeds a determined value (variable), a predictive control execution signal is output (made ON), and when the difference of the pulse numbers returns to approximately zero, the predictive control execution signal is made OFF;

a first differentiator 68 where the travel distance of the left driven travel wheel 14A detected by the first counter 65 is differentiated, and then multiplied with a coefficient described below to obtain the (marginal) travel distance during a definite time period of the left driven travel wheel 14A;

a first adder 69 where the travel distance of the left driven travel wheel 14A detected by the first counter 65 is added to the (marginal) travel distance during a definite time period of the left driven travel wheel 14A obtained by the first differentiator 68 to obtain a predictive travel distance after the definite time;

a second differentiator 70 where the travel distance of the right driven travel wheel 14A detected by the second counter 66 is differentiated, and then multiplied with a coefficient described below to obtain the (marginal) travel distance per during a definite time period of the right driven travel wheel 14A;

a second adder 71 where the travel distance of the right driven travel wheel 14A detected by the second counter 66 is added to the (marginal) travel distance during a definite time period of the left driven travel wheel 14A obtained by the second differentiator 70 to obtain a predictive travel distance after the definite time period;

a first subtractor 72 where the travel distance of the right driven travel wheel 14A detected by the second counter 66 is subtracted from the travel distance of the left driven travel wheel 14A detected by the first counter 65 to obtain a travel distance deviation between the left and right driven travel wheels 14A;

a second subtractor 73 where the predictive travel distance after the definite time period of the right driven travel wheel 14A obtained by the second adder 71 is subtracted from the predictive travel distance after the definite time period of the left driven travel wheel 14A obtained by the first adder 69 to obtain a predictive travel distance deviation between the left and right driven travel wheels 14A;

a timer 74 that starts counting the time triggered by a travel start pulse signal output from the travel reset unit 64, stops counting the time by a predictive control execution signal output from the pulse error judgment unit 67, and outputs the aforementioned coefficient that is inversely proportional to the obtained time, namely a coefficient based on the trend until the difference of the pulse numbers (the travel distance deviation) exceeds a predetermined value; and a speed control unit 75 (more details will be described below).

(Forced Travel Control Unit 61)

As shown in FIG. 12, to a forced travel control unit 61 are input operational signals of the respective switches 51 to 55 on the operation panel 40 and forward and backward approach signals detected by the forward and backward proximity sensors 37a and 37b, respectively; and a "forced" selection signal is output to a speed control unit 75 when "forced" is selected by the automated/forced selection switch 51, and an "automated" selection signal is output to the speed control unit 75 when "automated" is selected.

If the HP turn switch 52 is tilted to the forward side (FW side) during when "forced" is selected by the automated/forced selection switch 51, an HP motor forward driving signal is output to the speed control unit 75, and if the same is tilted to the backward side (RE side), an HP motor backward driving signal is output to the speed control unit 75. When the OP turn switch 53 is tilted to the forward side (FW side), an OP motor forward driving signal is output to the speed control unit 75, and when the same is tilted to the backward side (RE side), an OP motor backward driving signal is output to the speed control unit 75.

Further, when "forced" is selected by the automated/forced selection switch 51 and an HP shift button switch 54 is pushed on, if the approach signal of the forward proximity sensor 37a is made ON, a backward forced HP widthwise shift correction command signal, commanding enforced elimination of the widthwise shift to the HP side by backward traveling, is activated and output to the speed control unit 75, and if the approach signal of a backward proximity sensor 37b is made ON, a forward forced HP widthwise shift correction command signal, commanding enforced elimination of the widthwise shift to the HP side by forward traveling, is activated and output to the speed control unit 75.

Meanwhile, when the backward forced OP widthwise shift correction command signal or the forward forced OP widthwise shift correction command signal described below has been activated, the operation of the HP shift button switch 54 is not accepted since the preceding operation of the OP shift button switch 55 has a priority.

Further, when "forced" is selected by the automated/forced selection switch 51, if an OP shift button switch 55 is pushed on and the approach signal of the forward proximity sensor 37a is made ON, a backward forced OP widthwise shift correction command signal, commanding enforced elimination of the widthwise shift to the OP side by backward traveling, is activated and output to the speed control unit 75. When the approach signal of a backward proximity sensor 37b is made ON, a forward forced OP widthwise shift correction command signal, commanding enforced elimination of the widthwise shift to the OP side by forward traveling, is activated and output to the speed control unit 75.

Further, when the backward forced HP widthwise shift correction command signal or the forward forced HP widthwise shift correction command signal has been activated, the operation of the OP shift button switch 55 is not accepted since the preceding operation of the HP shift button switch 54 has a priority.

Further, when the approach signal of the backward proximity sensor 37b is activated, the backward forced HP widthwise shift correction command signal and the backward forced OP widthwise shift correction command signal are reset; and when the approach signal of the forward proximity sensor 37a is activated, the forward forced HP widthwise shift correction command signal and the forward forced OP widthwise shift correction command signal are reset.

(Automated Travel Judgment Unit 63)

To the automated travel judgment unit 63, are supplied the travel direction signal and the presence signal for widthwise shift control are input from the main control panel 38, the magnetic intensity at the HP side from the HP magnetic detection unit 62a, the magnetic intensity at the OP side from the OP magnetic detection unit 62b, and the approach signal of the adjacent movable rack 11 of the forward and backward proximity sensors 37a and 37b. The unit judges if the movable rack 11 should be moved forward or backward by the travel direction signal, outputs an advancing command or a retreating command with a time delay, in case the presence signal for widthwise shift control is present; and outputs a stop command is output when the approach signal from the proximity sensor 37a or 37b in the travel direction is present or the magnetic intensity is detected at the HP side or at the OP side. Furthermore, although not illustrated, when the photoelectric sensor 6 is activated, it also outputs a stop command.

(Speed Controll Unit 75)

As shown in FIG. 11, a speed control unit 75 comprises a forced driving unit 77, a semi-automatic widthwise shift control unit 78, an automatic attitude controller 79 and an automatic widthwise shift control unit 80. In the speed control unit 75, speed value commands for the left and right vector control inverters 42a and 42b (corresponding to the driving rotation speed by the rotation driving means) is obtained based on forced travel command signal etc. of the forced travel control unit 61, a travel decision signal of the automated travel judgment unit 63, the travel distance deviation between the left and right driven travel wheels 14A obtained by the 1st subtractor 72, the predictive travel distance deviation between the left and right driven travel wheels 14A obtained by the 2nd subtractor 73, the predictive control execution signal output from the pulse error judgment unit 67, the magnetic intensity and the widthwise shift direction at the HP side obtained by the HP magnetic detection unit 62a, and the magnetic intensity at the OP side obtained by the OP magnetic detection unit 62b. The control unit 75 further outputs an alarm signal to the alarm lamp 43, a caution signal to the caution lamp 44, and a widthwise shift control execution signal to the main control panel 38.

As shown in FIG. 12, there are further provided a relay RY-FOR activated by the "forced" selection signal output from the forced travel control unit 61 and a relay RY-AUTO activated by the "automated" selection signal output from the forced travel control unit 61. As shown in FIG. 16, there is further provided a relay RY-W that is activated, when relay RY-W-OP is ON, or RY-W-HP is ON in accordance with the output of the automatic widthwise shift control unit 80.

(Forced Driving Unit 77)

As shown in FIG. 12, in the forced driving unit 77 are provided a relay RY-HP-FW activated when an HP motor forward driving signal of the forced travel control unit 61 is input, a relay RY-HP-RE activated when an HP motor backward driving signal of the forced travel control unit 61 is input, a relay RY-OP-FW activated when an OP motor forward driving signal of the forced travel control unit 61 is input, and a relay RY-OP-RE activated when an OP motor backward driving signal of the forced travel control unit 61 is input.

Furthermore, as shown in FIG. 13, in the forced driving unit 77 are provided an HP speed setter 81 set at the commanded speed value for the HP driven travel wheel 14A at manual operation, and an OP speed setter 82 set at the commanded speed value for the OP driven travel wheel 14A at manual operation.

The commanded speed value for the HP driven travel wheel 14A set at the HP speed setter 81 is output by the operation of the relay RY-HP-FW and the value attaching a minus sign to the commanded speed value for the HP driven travel wheel 14A is output by the operation of the relay RY-HP-RE.

The commanded speed value for the OP driven travel wheel 14A set at the OP speed setter 82 is output by the operation of the relay RY-OP-FW and the value attaching a minus sign to the commanded speed value for the OP driven travel wheel 14A is output by the operation of the relay RY-OP-RE.

Note that, the commanded speed value constitutes an advancing commanded speed value if it is positive, and a retreating commanded speed value if it is negative.

The function of the constitution of the forced driving unit 77 will be described below.

If "forced" is selected by the automated/forced selection switch 51, when the OP turn switch 52 is tilted to the forward side (FW side) the relay RY-HP-FW is activated to output the positive (advancing) commanded speed value for the HP driven travel wheel 14A set at the HP speed setter 81, so that the HP driven travel wheel 14A is driven forward by the HP driving motor 16. While, when the HP turn switch 52 is tilted to the backward side (RE side), the relay RY-HP-RE is activated to output the (retreating) commanded speed value for the HP driven travel wheel 14A attaching a minus sign to the commanded speed value set at the HP speed setter 81, so that the HP driven travel wheel 14A is driven backward by the HP driving motor 16.

Similarly, if "forced" is selected by the automated/forced selection switch 51, when the OP turn switch 53 is tilted to the forward side (FW side) the relay RY-OP-FW is activated to output the positive (advancing) commanded speed value for the OP driven travel wheel 14A set at the OP speed setter 82, so that the OP driven travel wheel 14A is driven forward by the OP driving motor 16. While, when the OP turn switch 53 is tilted to the backward side (RE side), the relay RY-OP-RE is activated to output the (retreating) commanded speed value for the OP driven travel wheel 14A attaching a minus sign to the commanded speed value set at the OP speed setter 82, so that the OP driven travel wheel 14A is driven backward by the OP driving motor 16.

By operating the HP turn switch 52 and OP turn switch 53 as mentioned above, the movable rack 11 can be turned as shown in FIGS. 10 (A) and (B). That is, when "forced" is selected by the automated/forced selection switch 51, if the HP turn switch 52 is tilted forward (FW side) and the OP turn switch 53 backward (RE side) as shown in FIG. 10 (A), the HP driving motor 16 is directly driven to drive forward the HP driven travel wheel 14A, and the OP driving motor 16 is directly driven to drive backward the OP driven travel wheel 14A, so that the movable rack 11 becomes skewed to the HP side. Contrary, if the HP turn switch 52 is tilted backward (RE side) and the OP turn switch 53 forward (FW side) as shown in FIG. 10 (B), the movable rack 11 skews with the OP side.

(Semi-Automatic Widthwise Shift Control Unit 78)

As shown in FIG. 12, in the semi-automatic widthwise shift control unit 78 are provided a relay RY-WS-HP-RE activated when a backward forced HP widthwise shift correction command signal of the forced travel control unit 61 is input, a relay RY-WS-HP-FW activated when a forward forced HP widthwise shift correction command signal of the forced travel control unit 61 is input, a relay RY-WS-OP-RE activated when a backward forced OP widthwise shift correction command signal of the forced travel control unit 61 is input, and a relay RY-WS-OP-FW activated when a forward forced OP widthwise shift correction command signal of the forced travel control unit 61 is input.

Further, as shown in FIG. 14, in the semi-automatic widthwise shift control unit 78 is provided a relay RY-WS that is activated when a relay RY-WS-HP-RE is activated, or a relay RY-WS-HP-FW is activated, or a relay RY-WS-OP-RE is activated, or a relay RY-WS-OP-FW is activated. In the semi-automatic widthwise shift control unit 78 are further provided a 1st speed commander 83 that starts to output a pre-set commanded speed value for one of the driven travel wheels 14A when a relay RY-WS is activated, and a 2nd speed commander 84 that starts to output a pre-set commanded speed value for the other driven travel wheel 14A when a relay RY-WS is activated.

To the HP vector control inverter 42a are output a commanded speed value output from the 1st speed commander 83 when a relay RY-WS-OP-FW is activated, a commanded speed value output from the 2nd speed commander 84 when a relay RY-WS-HP-FW is activated, a negative commanded speed value output from the 1st speed commander 83 when a relay RY-WS-OP-RE is activated, and a negative commanded speed value output from the 2nd speed commander 84 when a relay RY-WS-HP-RE is activated.

To the OP vector control inverter 42b are output a commanded speed value output from the 2nd speed commander 84 when a relay RY-WS-OP-FW is activated, a commanded speed value output from the 1st speed commander 83 when a relay RY-WS-HP-FW is activated, a negative commanded speed value output from the 2nd speed commander 84 when a relay RY-WS-OP-RE is activated, and a negative commanded speed value output from the 1st speed commander 83 when a relay RY-WS-HP-RE is activated.

Note that, a positive commanded speed value means the commanded speed value for advancing, and a negative value means the commanded speed value for retreating.

The commanded speed values output from the 1st speed commander 83 and the 2nd speed commander 84 will be described below.

Assumed that a widthwise shift of a movable rack 11x occurs as shown in FIG. 17 (A), a travel route of the movable rack 11 (correcting route) is determined to eliminate a pre-determined width of the widthwise shift during when the rack travels the width of the work corridor (travel direction), for example 2m, as indicated by FIG. 17 (B) (an example to decrease the widthwise shift). As shown in FIG. 17 (D), the time series of the rotation speeds (commanded speed values) of the HP driving motor 16 and the OP driving motor 16 are computed for realizing the travel route; the 1st speed commander 83 is set at the time series of the rotation speeds (commanded speed value) of one of the driving motors 16 (at the HP side in the current embodiment); and the 2nd speed commander 84 is set at the time series of the rotation speeds (commanded speed value) of the other driving motor 16 (at the OP side in the current embodiment). The pre-determined width is limited to the physically adjustable range, which is defined by the maximum rotation speed and the speed change attainable by the driving motors 16 while the movable rack 11 travels across the width of the work corridor S.

As for the travel route, the movable rack 11 is first translated parallel, namely both the driving motors 16 are started simultaneously at a rotation speed above the pre-determined rotation speed (the rotation speed at which both the HP and OP driven travel wheels 14A do not slip); then the movable rack 11 is, while travelling, skewed to the direction to eliminate the widthwise shift by the angle as indicated in FIG. 17 (C), namely both the driving motors 16 rotating are driven with different rotating speeds, then the movable rack 11 is skewed back to the angle "0" (so as to make the attitude thereof to the original position) while traveling, both the driving motors 16 are driven at "reversely" different rotation speeds; and finally the movable rack 11 is translated parallel, namely by driving the same by both the driving motors 16 rotating simultaneously at the same rotation speed to conclude the travel route.

As described above, by changing the commanded speed values over time after the rack starts traveling, the pre-determined travel route for the movable rack 11 can be realized. In the present embodiment, the widthwise shift to be eliminated by one operation of the HP shift button switch 54 and the OP shift button switch 55 is set at ½ of the width corrected by a travel across the width of the work corridor S (the maximum width). Therefore, the maximum width can be eliminated by two-time operations.

The function of such structure of the semi-automatic widthwise shift control unit 78 is described below.

When "forced" is selected by the automated/forced selection switch 51, if the HP shift button switch 54 is pushed ON, the open side of the movable rack 11 (the side where the work corridor S is formed and the movable rack 11 can travel alone) is determined by the approach signal output by the proximity sensor 37a or 37b and a forward or backward forced HP widthwise shift correction command is generated to activate the relay RY-WS-HP-FW or the relay RY-WS-HP-RE, as shown in FIG. 12.

If the relay RY-WS-HP-FW is activated, a commanded speed value is output from the 2nd speed commander 84 to the HP vector control inverter 42a according to the travel route, a commanded speed value is output from the 1st speed commander 83 to the OP vector control inverter 42b according to the travel route. In accordance with these commanded speed values, the driving motors 16 at the HP and OP sides are driven, so that the movable rack 11 advances along the travel route as shown in FIG. 10 (C), and the movable rack 11 moves to the HP direction by the pre-determined width.

Further, if the relay RY-WS-HP-RE is activated, a negative (reverse direction) commanded speed value is output from the 2nd speed commander 83 to the HP vector control inverter 42a according to the travel route, a negative (reverse direction) commanded speed value is output from the 2nd speed commander 84 to the OP vector control inverter 42b according to the travel route. In accordance with these commanded speed values the driving motors 16 at the HP and OP sides are driven, so that the movable rack 11 retreat along the travel route as shown in FIG. 10 (C), however in the opposite direction with respect to the fore and aft direction A, and the movable rack 11 moves to the HP side by the pre-determined width.

When "forced" is selected as above by the automated/forced selection switch 51, if the HP shift button switch 54 is pushed ON, the movable rack 11, traveling to the direction of the work corridor S, moves to the HP side by the pre-determined width.

Further, when "forced" is selected by the automated/forced selection switch 51, if the OP shift button switch 55 is pushed ON, an open side of the movable rack 11 (the side where the work corridor S is formed and the movable rack 11 can travel alone) is determined by the approach signal output by the proximity sensor 37a or 37b and a forward or backward forced HP widthwise shift correction command is generated, to activate the relay RY-WS-OP-FW or the relay RY-WS-OP-RE, as shown in FIG. 12.

If the relay RY-WS-OP-FW is activated, a commanded speed value is output from the 1st speed commander 83 to the HP vector control inverter 42a according to the travel route, a commanded speed value is output from the 2nd speed commander 84 to the OP vector control inverter 42b according to the travel route. In accordance with these commanded speed values, the driving motors 16 at the HP and OP sides are driven, so that the movable rack 11 advances and moves to the OP side by the pre-determined width as the travel route shown in FIG. 10 (D).

Further, if the relay RY-WS-OP-RE is activated, a negative commanded speed value is output from the 1st speed commander 83 to the HP vector control inverter 42a according to the travel route, a negative commanded speed value is output from the 2nd speed commander 84 to the OP vector control inverter 42b according to the travel route. In accordance with these commanded speed values, the driving motors 16 at the HP and OP sides are driven, so that the movable rack 11 retreats along the travel route as shown in FIG. 10 (D), however in the opposite direction with respect to the fore and aft direction A, and the movable rack 11 moves to the OP side by the pre-determined width.

When "forced" is selected as above by the automated/forced selection switch 51, if the OP shift button switch 55 is pushed ON, the movable rack 11, traveling to the direction of the work corridor S, moves to the OP side by the pre-determined width.

(Automatic Attitude Controller 79)

As shown in FIG. 15, in the automatic attitude controller 79 are provided a relay RY-F activated when a travel command signal of the automated travel judgment unit 63 is an advancing command (to be output with time-delay if the widthwise shift control signal is present), a relay RY-B activated when the same is a retreating command (to be output with time-delay if the widthwise shift control signal is present), a relay RY-S activated when the same is a stop command, and a relay RY-M activated when the predictive control execution signal from the pulse error judgment unit 67 is ON.

In the automatic attitude controller 79, is further provided a speed setter 85 for a pre-determined travel speed of the movable rack 11. It is so configured that, according to the action of a relay RY-M, the travel distance deviation is selected if the predictive control execution signal is not present, and the predictive travel distance deviation is selected if the predictive control execution signal is present. Further, a 1st function unit 86 is provided to calculate a speed adjustment amount for the HP driven travel wheel 14A, as well as a 2nd function unit 87 to calculate a speed adjustment amount for the OP driven travel wheel 14A, both based on the selected deviation. When the positive deviation value exceeds the positive pre-determined value (dead band), the 1st function unit 86 outputs a positive corrective speed value proportional thereto; and when the negative deviation value exceeds the negative pre-determined value (dead band), the 2nd function unit 87 outputs a negative corrective speed value proportional thereto. Thus, when the selected deviation exceeds the positive or negative pre-determined value (dead band), the 1st function unit 86 or the 2nd function unit 87 outputs a corrective speed value to execute the movable rack attitude control (skewing correction control).

The automatic attitude controller 79 further comprises a 3rd subtractor 88 that subtracts the positive corrective speed value output from the 1st function unit 86 from the pre-determined travel speed of the movable rack 11 set at the speed setter 85 to obtain the commanded speed value for the HP driven travel wheel 14A; and a 1st low limiter 89 that limits the lower limit of the commanded speed value for the HP driven travel wheel 14A obtained by the 3rd subtractor 88 to assure the lowest speed. Therefore, the lower-limited commanded speed value for the HP driven travel wheel 14A is selected by the operation of relay RY-F (activated by an advancing command), the low-limited commanded speed value for the HP driven travel wheel 14A inverted to a negative value is selected by the operation of relay RY-B (activated by a retreating command); and "0" is selected as the commanded speed value for the HP driven travel wheel 14A by the operation of relay RY-S (activated by a stop command), so that the commanded speed value is output to the HP vector control inverter 42a.

The automatic attitude controller 79 further comprises a 4th subtractor 90 that subtract the corrective speed value output from the 2nd function unit 87 from the pre-determined travel speed of the movable rack 11 set at the speed setter 85 to obtain the commanded speed value for the OP driven travel wheel 14A; and a 2nd low limiter 91 that limits the lower limit of the commanded speed value for the right driven travel wheel 14A obtained by the 4th subtractor 90 to assure the lowest speed. Therefore, the low-limited commanded speed value for the OP driven travel wheel 14A is selected by the operation of relay RY-F (activated by an advancing command), the low-limited commanded speed value for the OP driven travel wheel 14A inverted to a negative value is selected by the operation of relay RY-B (activated by a retreating command), and "0" is selected as the commanded speed value for the OP driven travel wheel 14A by the operation of relay RY-S (activated by a stop command), so that the commanded speed value is output to the OP vector control inverter 42b.

The function of such structure of the automatic attitude controller 79 is described below.

If an advancing command or a retreating command is input from the main control panel 38, the speed setter 85 outputs a commanded speed value, which is positive at advancing and negative at retreating, to the HP vector control inverter 42a and the OP vector control inverter 42b to move the movable rack 11. If a stop command is input from the main control panel 38, the commanded speed value of "0" is output to the HP vector control inverter 42a and the OP vector control inverter 42b to stop the movable rack 11.

During the travel of the movable rack 11, the travel distance deviation of the driven travel wheels 14A is detected by two pulse encoders 21 at both the sides and the counters 65 and 66, based on which the deviation of the travel distances of both the driven travel wheels 14A is calculated and input. The commanded speed values output from the speed setter 85 are corrected to eliminate the deviation and the differentiated commanded speed values are output to the HP vector control inverter 42a and the OP vector control inverter 42b to correct the driving rotation speeds of the respective driving motors 16 to control the attitude of the movable rack 11.

Further, if the deviation of the travel distances between both driven travel wheels 14A from the start of the travel exceeds a pre-set value, a predictive travel distance is calculated based on the travel distance and the time elapsed from the start of the travel until the difference in the accumulated pulse counts exceeds the pre-set value, and a control signal is output to the vector control inverter 42a or 42b for the driving motor 16 connected to the driven travel wheel 14A on the side with an advancing predictive travel distance, to decrease the driving rotation speed. According to the above measures, the driving rotation speed of the driving motor 16 for the side moving ahead is decreased and the side moving ahead moves thereafter slower than the delayed side so that the skewed attitude can be corrected according to the predictive travel distance preemptively and gradually to final complete elimination. By this predictive control, a stable travel control without overshooting is possible, while by a control relied only on the travel distance deviation, overshooting of the deviation is unavoidable.

As described above, the automatic attitude controller 79 executes the attitude correction control for the movable rack 11, where the driving rotation speeds of the respective driving motors 16 are controlled based on the detected travel distances of both the driven travel wheels 14A, so as to eliminate the deviation of the travel distances of both the driven travel wheels 14A.

(Automatic Widthwise Shift Control Unit 80)

As shown in FIG. 16, an automatic widthwise shift control unit 80 is provided with a 3rd adder 92 that adds the magnetic intensity at the HP position measured by the HP magnetic detection unit 62a and the magnetic intensity at the OP position measured by the OP magnetic detection unit 62b to determine the total magnetic intensity, and a previous magnetic intensity memory 93 that stores the total magnetic intensity determined by the 3rd adder 92 during the travel stop time with time-delay (after elapse of a definite time by a timer from the activation of the relay RY-S).

Further provided are a 1st comparator 94 that detects existence or non-existence of magnetic intensity at the HP position to be measured by the HP magnetic detection unit 62a, and a 2nd comparator 95 that detects existence or non-existence of magnetic intensity at the OP position to be measured by the OP magnetic detection unit 62b; and when the relay RY-S (stop command) is activated, if non-existence of magnetic intensity is detected by the 1st comparator 94 or the 2nd comparator 95, an alarm signal is output to the alarm lamp 43; and when the relay RY-S (stop command) is activated, if existence of magnetic intensity is detected by the 1st comparator 94 and the 2nd comparator 95, the aforedescribed reset signal is output.

Further provided is a widthwise shift detector 96 that determines the widthwise shift in the transverse B of the travel path 10 generated by the current travel (the difference between the total magnetic intensities is converted to the widthwise shift) from the difference between the total magnetic intensity determined by the 3rd adder 92 and the previous total magnetic intensitiestored in the previous magnetic intensity memory 93, when the relay RY-S (stop command) is activated. There detector 96 examines whether the widthwise shift exceeds the pre-set widthwise shift; and in case exceeding the pre-set widthwise shift, if deviation to the HP side is detected by the HP magnetic detection unit 62a, it outputs a signal for widthwise shift correction to the OP side, and if deviation to the OP side is detected by the HP magnetic detection unit 62a, it outputs a signal for widthwise shift correction to the HP side. Further provided are a relay RY-W-OP activated by the signal for widthwise shift correction to the OP side and a relay RY-W-HP activated by the signal for widthwise shift correction to the HP side.

Further provided are a 3rd speed commander 97 that outputs a pre-set commanded speed value to one of the driven travel wheels 14A, and a 4th speed commander 98 that outputs a pre-set commanded speed value to the other driven travel wheel 14A, whose execution is initiated if the relay RY-W-OP or the relay RY-W-HP is activated, AND the relay-F (advancing command) or the relay RY-B (retreating command) is activated.

The commanded speed value is output to the HP vector control inverter 42a as follows. If the relay RY-W-OP is activated, the commanded speed value output from the 3rd speed commander 97, and if the relay RY-W-HP is activated, the commanded speed value output from the 4th speed commander 98 is requested, and the commanded speed value is selected by the relay RY-F (advancing command), the commanded speed value inverted to a negative value is selected by the relay RY-B (retreating command), and the commanded speed value of "0" is selected, and output by the relay RY-S (stop command).

Similarly, the commanded speed value is output to the OP vector control inverter 42b as follows. If the relay RY-W-OP is activated, the commanded speed value output from the 4th speed commander 98, and if the relay RY-W-HP is activated, the commanded speed value output from the 3rd speed commander 97 is requested, and the commanded speed value is selected by the relay RY-F (advancing command), the commanded speed value inverted to a negative value is selected by the relay RY-B (retreating command), and the commanded speed value of "0" is selected, and output by the relay RY-S (stop command).

Further provided is a frequency detector 99 that counts the number of actions of the relay RY-W-OP or the relay RY-W-HP, namely determines the frequency of the executions of travels correcting the widthwise shift, and if the frequency exceeds the pre-determined frequency, outputs a caution signal to the caution lamp 44. The frequency detector 99 may determine the number of the executions of travels correcting the widthwise shift, and if the number exceeds the pre-determined number, outputs a caution signal.

A setting method of the commanded speed value output from the 3rd speed commander 97 and the 4th speed commander 98 is similar to the setting method of the commanded speed value output from the 1st speed commander 83 and the 2nd speed commander 84 of the semi-automatic widthwise shift control unit 78. However, in the automatic widthwise shift control unit 80 the magnitude of the widthwise shift to be corrected is set at the maximum width that can be corrected by a single travel, namely a travel across the width of the work corridor S, and the difference of the total magnetic intensity determining the widthwise shift in the transverse direction B of the travel path 10 is correlated with the set maximum width.

Although the correctable widthwise shift by a single travel is set at the maximum correctable width in the above automatic widthwise shift control unit 80, it may be set at ½ of the same as in the case of the semi-automatic widthwise shift control unit 78. In this case, the widthwise shift control is executed at the next and at the second travels to eliminate completely the deviation with 2 travels. It is further possible to eliminate the widthwise shift with 3 or more repeated travels.

The function of such structure of the automatic widthwise shift control unit 80 is described below.

When the movable rack 11 stops traveling, the magnet 31 is detected by the respective HP and OP magnetic sensors 35, and if the difference between the detected total magnetic intensity and the total magnetic intensitiestored at the previous travel stop exceeds a pre-determined value, namely if a widthwise shift above a pre-determined value is detected, the relay RY-W-OP is activated if a correction to the OP side is determined to be necessary, and the relay RY-W-HP is activated if a correction to the HP side is determined to be necessary. When a widthwise shift occurs, a widthwise shift control execution signal is output to the main control panel 38, the occurrence of the widthwise shift is counted. If it exceeds a pre-determined frequency, a caution signal is output to light up the caution lamp 44, judging that the movable rack 11 is suffering from frequent widthwise shifts. Further, if the magnetic sensitivity of either of the HP or OP magnetic sensor 35 is lost, namely if the magnet 31 is not detected, it is so judged that the automatic widthwise shift control is malfunctioning and a widthwise shift has occurred which cannot be corrected automatically. Then, an alarm signal is output recommending the activation of the HP shift button switch 54 or the OP shift button switch 55, and an alarm lamp 43 is lighted up.

When the relay RY-W-OP or the relay RY-W-HP is activated as above, and the relay RY-F (advancing command) or the relay RY-B (retreating command) functions by the next travel command, a commanded speed value is output from the 3rd speed commander 97 and the 4th speed commander 98.

During when the relay RY-W-OP is activated, if the relay RY-F (advancing command) is activated, a positive commanded speed value output from the 3rd speed commander 97 is output to the HP vector control inverter 42*a*, a positive commanded speed value output from the 4th speed commander 98 is output to the OP vector control inverter 42*b*, and the movable rack controller 41 controls to drive the HP and OP driving motors 16 according to the commanded speed values so that the movable rack 11 advances and shifts to the OP side by a pre-determined width. If the relay RY-B (retreating command) is activated, a negative commanded speed value output from the 3rd speed commander 97 is output to the HP vector control inverter 42*a*, a negative commanded speed value output from the 4th speed commander 98 is output to the OP vector control inverter 42*b*, and the movable rack controller 41 controls to drive the HP and OP driving motors 16 according to the commanded speed values so that the movable rack 11 retreats and shifts to the OP side by a pre-determined width.

Similarly, when the relay RY-W-HP is activated, if the relay RY-F (advancing command) is activated, a positive commanded speed value output from the 4th speed commander 98 is output to the HP vector control inverter 42*a*, a positive commanded speed value output from the 3rd speed commander 97 is output to the OP vector control inverter 42*b*, and the movable rack controller 41 controls to drive the HP and OP driving motors 16 according to the commanded speed values so that the movable rack 11 advances and shifts to the HP side by a pre-determined width. If the relay RY-B (retreating command) is activated, a negative commanded speed value output from the 4th speed commander 98 is output to the HP vector control inverter 42*a*, a negative commanded speed value output from the 3rd speed commander 97 is output to the OP vector control inverter 42*b*, and the movable rack controller 41 controls to drive the HP and OP driving motors 16 according to the commanded speed values so that the movable rack 11 retreats and shifts to the HP side by a pre-determined width.

If the relay RY-S (stop command) is activated, the commanded speed value of "0" is output to the HP vector control inverter 42*a* and the OP vector control inverter 42*b* and the movable rack 11 is stopped.

(Output from Speed Controll Unit 75)

The speed control unit 75 switches to output commanded speed values for the HP vector control inverter 42*a* and the OP vector control inverter 42*b* respectively, which are output from the forced driving unit 77, the semi-automatic widthwise shift control unit 78, the automatic attitude controller 79 and the automatic widthwise shift control unit 80, by use of the relay RY-FOR (to select "forced"), the relay RY-AUTO (to select "automated") and the relay RY-W (widthwise shift control underway).

More particularly, the output signal of the forced driving unit 77 and the semi-automatic widthwise shift control unit 78 is output when the relay RY-FOR is activated, the output signal of the automatic attitude controller 79 is output when the relay RY-AUTO is activated and the relay RY-W is NOT activated, and the output signal of the automatic widthwise shift control unit 80 is output when the relay RY-AUTO is activated and the relay RY-W is also activated.

(Overall Function)

The function of the embodiment is described below.

As shown in FIG. 1 and FIG. 3, by moving one or more movable racks 11 on the travel path 10, the work corridor S can be formed in front of the subject movable rack 11 to make possible to handle goods to and from a desired section accommodating space 13*e* can be carried out in the work corridor S. The handling of goods is performed, for example by driving a forklift in the work corridor S by means of pallets.

Since the magnets 31 are buried in the floor surface 1*a* of the work corridor S, but there is no obstacle on the floor surface 1*a* outside the edge of the work corridor S, a vehicle such as a forklift can run quite freely, even allowed to pass through the work corridor S in any one direction. Therefore, handling of goods or any other works utilizing the work corridor S can be performed rapidly and smoothly.

For example, to have the movable rack 11 standing at the stop position P5 in FIGS. 1 to 3 travel on the travel path 10 and stop at the stop position P6, the main control panel 38 is first operated. Then the same sends the travel command signal (travel direction signal) to the control panel 20 of the movable rack 11 standing at the stop position P5.

Accordingly, a pair of the HP and OP driving motors 16 are started to rotate respectively the driven travel wheels 14A. A driving force is given to the movable rack 11 to travel on the travel path 10, and the remaining travel wheels 14 follow rotating passively. Therefore, by means of a detection control system such as the proximity sensor 37*a* installed between the movable racks 11, the movable rack 11 can be stopped at the destination of the stop point P6 without colliding the same against a movable rack 11 standing at the stop point P7.

On an occasion of the travel of the movable rack 11, due to load imbalance of the stocked goods, unevenness of the floor surface 1*a*, slipperiness of the driven travel wheel 14A with respect to the floor surface 1*a*, wearing of the outer wheel 14*b* of the driven travel wheel 14A, etc., the movable rack 11 may not travel keeping the orthogonal attitude toward the travel path 10, but move as indicated by imaginary lines in FIG. 1, where one side goes ahead and the other side behind forming a skewed attitude.

In such a case, travel distances are measured by the pulse encoders 21 placed at both the sides in the transverse direction B and the control panel 20 controls the rotation speeds of the driving motors 16 based on the measurements. More particularly, a detection wheel unit 27 which is pressed to the floor surface 1a rotated by friction with the movement of the movable rack 11. By the rotation of the detection wheel unit 27, a rotation body 28 is rotated through a wheel unit shaft 26.

When the rotation body 28 rotates, the numbers of passages of the slits 28a and 28b formed on the turning unit 28 can be counted by the photoelectric switches 29a and 29b, and input to the control panel 20. The control panel 20 counts the pulses output from both the pulse encoders 21, calculates the travel distances of the respective driven travel wheels 14A, and compares them. In the current example, the travel distance of the HP driven travel wheel 14A is larger (ahead), and the travel distance of the OP driven travel wheel 14A is smaller (behind).

Based on the comparison, the control panel 20 outputs a control signal to reduce the driving rotation speed to the driving motor 16 connected to the driven travel wheel 14A on the side whose travel distance is ahead, namely to the vector control inverter 42a for the driving motor 16 connected with the HP driven travel wheel 14A. This reduces the driving rotation speed of the HP driving motor 16 and the HP side moves slower than the other side, so that the skewed attitude is gradually corrected to final complete elimination.

In the control panel 20, in case the difference in the accumulated numbers of pulses output from the respective pulse encoders 21 from the start of the travel exceeds the pre-set value, a predictive travel distance can be obtained based on the travel distance and the time elapsed until the difference in the accumulated numbers of pulses exceeds the pre-set value, and a control signal to reduce the driving rotation speed is output to the vector control inverter 42a or 42b for a driving motor 16 connected to the driven travel wheel 14A on the side whose predictive travel distance is ahead. This reduces the driving rotation speed of the driving motor 16 on the side moving ahead, and this advancing side moves slower thereafter than the delaying side, so that the skewed attitude is corrected according to the predictive travel distance preemptively and gradually to final complete elimination. By this predictive control, a stable travel control without overshooting is possible, while by a control relied only on the travel distance deviation, overshooting of the deviation is unavoidable.

Through such control by the control panel 20, the movable rack 11 can travel keeping the orthogonal attitude toward the travel path 10.

Furthermore, when stopped, the magnet 31 is measured by the HP and OP respective magnetic sensors 35, and if the deviation between the total magnetic intensity measured by the HP and OP magnetic sensors 35 and the previous total magnetic intensity is generated, this is recognized as generation of a widthwise shift, and then at the next travel control signals for differentiated rotation speeds are output to the vector control inverters 42a or 42b for the driving motors 16 connected to the driven travel wheels 14A in order to eliminate the widthwise shift. Therefore the widthwise shift can be eliminated while the rack travels across the work corridor S. At this time, the movable rack 11 to travel following the movable rack 11, which is subjected to the widthwise shift control, is started with a delay of the pre-determined time. Further, if magnetic sensitivity of either of the HP or OP magnetic sensor 35 is lost, namely if the magnet 31 is not detected, it is so judged that the automatic widthwise shift control is malfunctioning and a widthwise shift has occurred which cannot be corrected automatically, and an alarm lamp 43 is lighted up recommending the activation of the HP shift button switch 54 or the OP shift button switch 55. Further, if the frequency of the widthwise shift control exceeds a pre-determined value, the caution lamp 44 is lighted up.

A worker can move the movable rack 11 compulsorily using the operation panel 40.

When "forced" is selected by the automated/forced selection switch 51, if the HP turn switch 52 is tilted forward (FW side) and the OP turn switch 53 backward (RE side) as shown in FIG. 10 (A), the HP driving motor 16 is directly driven to drive the HP driven travel wheel 14A forward, and the OP driving motor 16 is directly driven to drive the OP driven travel wheel 14A backward, so that the movable rack 11 becomes skewed with the HP side. Reversely, if the HP turn switch 52 is tilted backward (RE side) and the OP turn switch 53 forward (FW side) as shown in FIG. 10 (B), the movable rack 11 becomes skewed with the OP side.

When "forced" is selected by the automated/forced selection switch 51 and the HP shift button switch 54 is pushed ON as shown in FIG. 10 (C), the movable rack 11 is shifted to the HP side by the pre-set width, and if the OP shift button switch 55 is pushed ON as shown in FIG. 10 (D), the movable rack 11 is shifted to the OP side by the pre-set width.

According to the embodiment, when the movable rack 11 stops traveling, the magnet 31 is measured by the HP and OP respective magnetic sensors 35, and if a widthwise shift above a pre-determined value is detected from the measured total magnetic intensity, a travel route of the movable rack to eliminate the widthwise shift is determined, and the rotation speeds of the respective driving motors 16 are controlled so that the travel route be followed at the next travel and the widthwise shift of the movable rack 11 can be corrected. Consequently there is no need to construct a detectable sheet rail target along the travel path 10 and inconveniences accompanied by the construction can be avoided.

Further, according to the embodiment, when a movable rack 11 implements a widthwise shift correction travel, and the movable rack 11 turns toward the direction to which the widthwise shift should be corrected for this purpose, a possible collision between the backward edge of the skewed movable rack 11 and the following movable rack 11 can be avoided by delaying the start of the travel of a following another movable rack 11 for a certain time period.

Further, according to the embodiment, when the HP and OP driving motors 16 are driven to eliminate a widthwise shift, a trouble caused by a phenomenon that, if a driven travel wheel 14A is stopped and the other driven travel wheel 14A is moved around this axis point, the first driven travel wheel 14A is dragged to move uncontrollably off the travel route, can be avoided by starting both the driving motors 16 above a pre-determined rotation speed.

Further, according to the embodiment, when the frequency (or the number) of the widthwise shift controls of a movable rack 11 is increased, a caution lamp 44 is lighted up and a worker can recognize that the widthwise shift occurs frequently at the movable rack 11. Thus, he/she can instruct re-learning of the values of travel distance per pulse to be set at the first counter 65 and the second counter 66.

Further, according to the embodiment, the widthwise shift control of the movable rack 11 is conducted by detecting the magnets 31 disposed at each stop position of the movable racks 11 by the magnetic sensors 35, requiring only the disposition of the magnets 31 at the stop positions of the respective movable racks 11. The construction thereof can be simpler than the that of the conventional sheet rail member to be detected.

Further, according to the embodiment, when the HP shift button switch 54 is activated, the rotation speeds of the respective driving motors 16 are controlled by the movable rack controller 41 of the movable rack 11 so that the rack follows the travel route determined to decrease the widthwise shift to the HP direction to shift the movable rack 11 to the HP direction in the transverse direction B by a pre-determined width; and when the OP shift button switch 55 is activated, the rotation speeds of the respective driving motors 16 are controlled by the movable rack controller 41 of the movable rack 11 so that the rack follows the travel route determined to decrease the widthwise shift to the OP direction to shift the movable rack 11 to the OP direction by a pre-determined width. Therefore, a worker can eliminate easily such a widthwise shift, which is difficult to be eliminated by operation with the HP turn switch 52 and the OP turn switch 53, only by activating the HP shift button switch 54 or the OP shift button switch 55, which can improve the operability.

When the movable rack 11 travels in response to the activation of the HP shift button switch 54 or the OP shift button switch 55, the movable rack 11 travels to the facing work corridor S, and therefore, the widthwise shift can be reliably eliminated.

Further, according to the embodiment, since the width of the widthwise shift to be eliminated by the activation of the HP shift button switch 54 or the OP shift button switch 55 is set within the given width that can be corrected during the travel across the work corridor S, it can be prevented that the rack stops with a skewed attitude by reason of detection of a movable rack 11 in the traveling direction can be avoided during the correction of the widthwise shift. If the movable rack 11 is in a skewed attitude as above, the width of the work corridor S in the travel direction A becomes narrow and handling of the goods becomes difficult.

Further, according to the embodiment, when the movable rack 11 is moving according to the activation of either of the HP shift button switch 54 or the OP shift button switch 55, the activation of the other OP shift button switch 55 or HP shift button switch 54 is invalidated, so that the stop with a skewed attitude of the rack can be avoided by a premature interruption of the semi-automatic widthwise shift control.

Further, according to the embodiment, if the magnet 31 is not detected when the rack 11 stops to travel, it is so judged that the automatic widthwise shift control is malfunctioning and a widthwise shift has occurred which cannot be corrected automatically, and an alarm lamp 43 is lighted up. A worker can recognize the direction of the widthwise shift of the rack by the alarm, and is urged to activate the HP shift button switch 54 or the OP shift button switch 55.

Further, according to the embodiment, the attitude control is conducted during a travel of the movable rack 11 by the movable rack controller 41, and therefore, it can be avoided that the movable rack 11 stops with a skewed attitude can be avoided.

In this embodiment, the movable rack 11 or stationary rack 3 is constituted of the lower frame unit 12 or 4, and the rack unit 13 or 5. However, a movable rack 11 of a carriage type or a stationary rack 3 of a platform type without the rack unit 13 and 5 may be used.

Further, the uppermost storage compartment 13e and 5a of the movable rack 11 and stationary rack 3 are open upward in this embodiment, but the movable rack 11 and stationary rack 3 having a roof on the top may be used.

Furthermore, in this embodiment the magnets 31 is buried in the floor, but thin magnets 31, over which a vehicle easily rides, may be laid on the floor surface 1a.

Furthermore, in this embodiment, the driving motor 16 drives a pair (2) of the driven travel wheels 14A, however, it is possible to arrange such that the driving motor 16 drives only one driven travel wheel 14A. Moreover, it may be possible to apply a direct driving system where a reducing gear is directly connected to the end of the drive wheel shaft of a driven travel wheel 14A and the driving motor 16 is directly connected to the reducing gear.

Furthermore, in this embodiment the travel wheels 14 are used as a supporting/running device, however, a roller chain type (a caterpillar type) supporting/running device may also be applicable. In this case, a singularity of the roller chain should be provided at each side of the movable rack 11 in the transverse direction B extending over the entire length thereof in the travel direction A, or a plurality of roller chains should be provided extending over the entire length in the travel direction A in a divided manner.

Furthermore, in this embodiment a pulse encoder 21 is used as a travel distance measuring device, and two-sets measuring system, where outer slits 28a and inner slits 28b are formed on the rotating body 28 and an outer photoelectric switch 29a facing the outer slits 28a and an inner photoelectric switch 29b facing the inner slits 28b are provided, is exemplified. However, one-set measuring system or three or more-sets measuring system may also be used.

Furthermore, in this embodiment the pulse encoder 21 uses a detection wheel unit 27 in order to measure the travel distance, but it is also possible to measure the driving rotation amount of the driven travel wheel 14A therefor. Moreover, the pulse encoder 21 detects the rotation of the detection wheel unit 27, instead it may be directly connected to the rotating shaft of the driving motor 16 (an example of a rotation driving device) to measure the travel distance of the movable rack 11.

Furthermore, in this embodiment the magnetic sensor 35 is used to detect a widthwise shift, however the widthwise shift may also be detected by such an arrangement that a plurality of regressive reflecting type photosensors are provided at the forward and backward surfaces of the movable rack 11 facing the opposing movable racks 11, and the reflectors be provided at the opposing movable racks 11 facing the photoelectric sensors, so that a widthwise shift can be detected by detecting the deactivation of the photoelectric sensor due to misalignment of the movable racks 11.

Furthermore, in this embodiment, when a plurality of movable racks 11 are started one by one at pre-determined time intervals to be moved substantially at the same time, however, the plurality of movable racks 11 may be started simultaneously.

Furthermore, in this embodiment, the magnets 31 are disposed within the width of the movable rack 11, but they may be disposed outside the width of the movable rack 11.

Furthermore, in this embodiment, goods are delivered and stored in and out of the storage compartment 13e of the movable rack 11 and the storage compartment 5a of the stationary rack 3 by means of pallets, but box containers may also be delivered and stored.

BRIEF DESCRIPTION OF THE DRAWINGS

FIG. 17 is illustrations concerning determination of a commanded speed value to be set at a speed commander of the semi-automatic widthwise shift control unit and the automatic widthwise shift control unit of the movable rack controller in the movable rack system.

DESCRIPTION OF SYMBOLS

Figure 1:
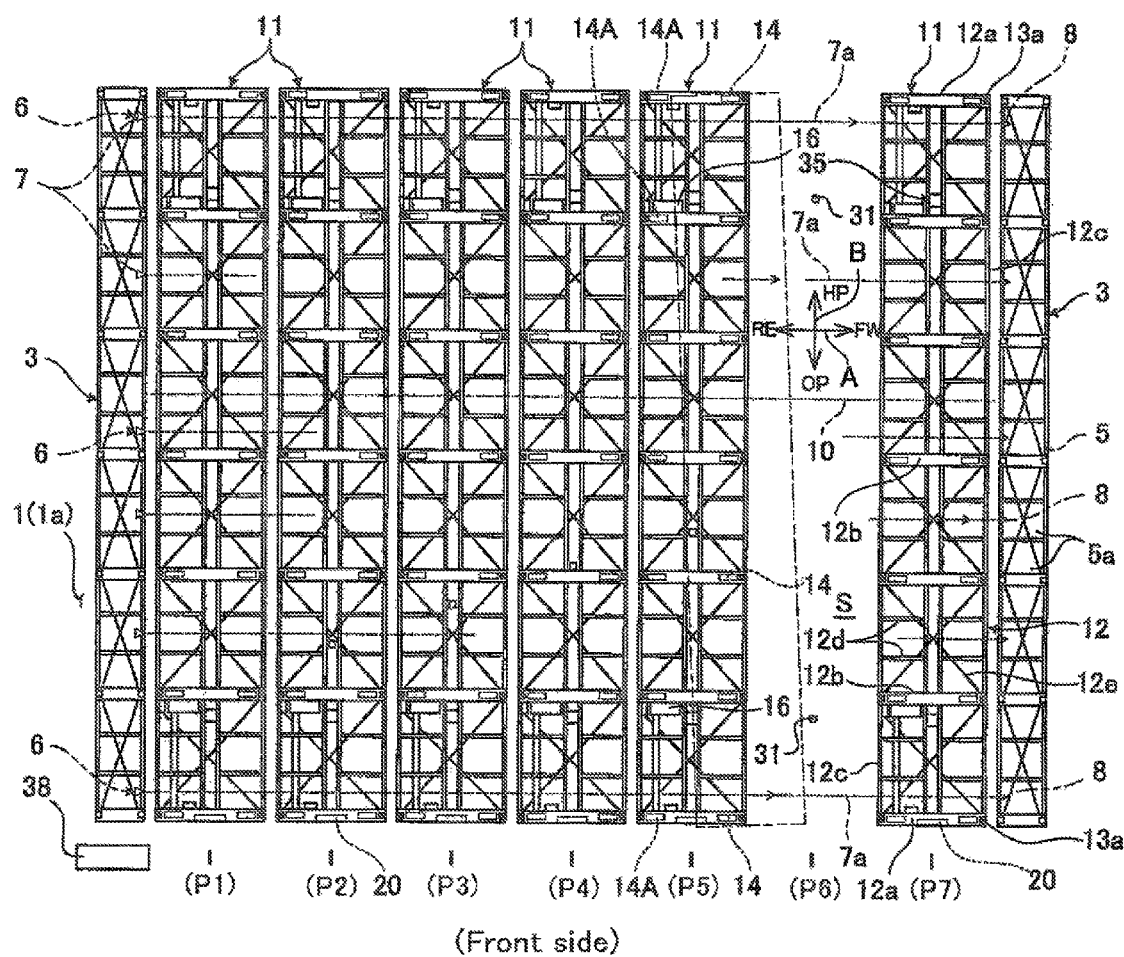
FIG. 1 is a plan view of a movable rack system of an embodiment of the present invention.
Figure 2:
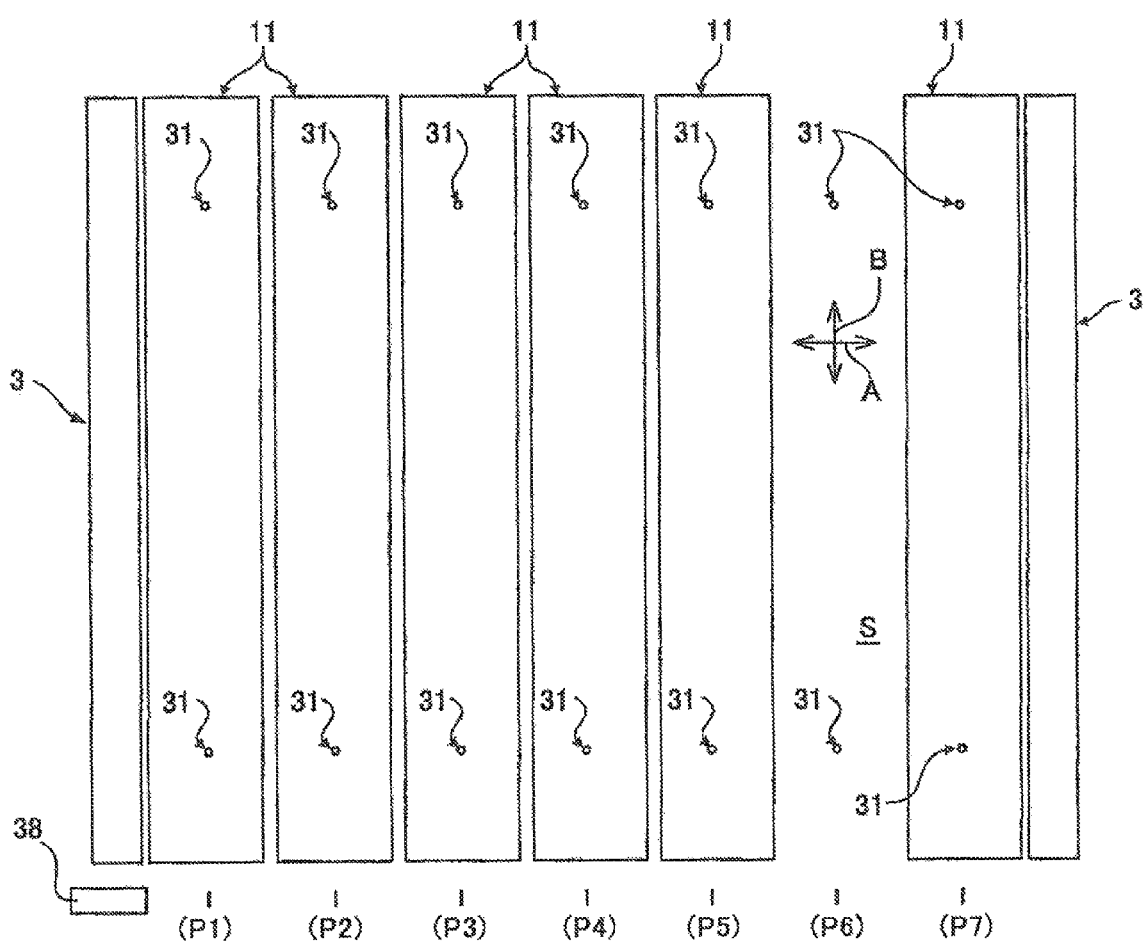
FIG. 2 is a plan view showing the disposition of the magnets in the movable rack system.
Figure 3:
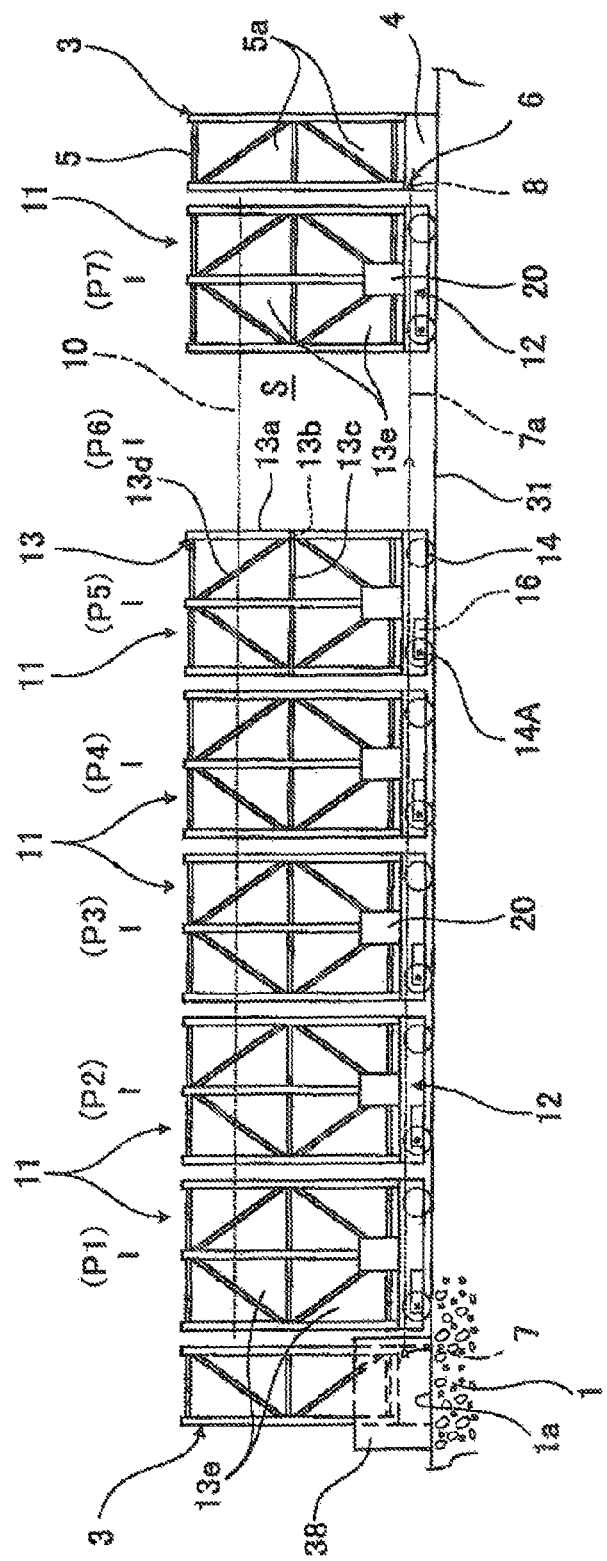
FIG. 3 is a side view of the movable rack system.
Figure 4:
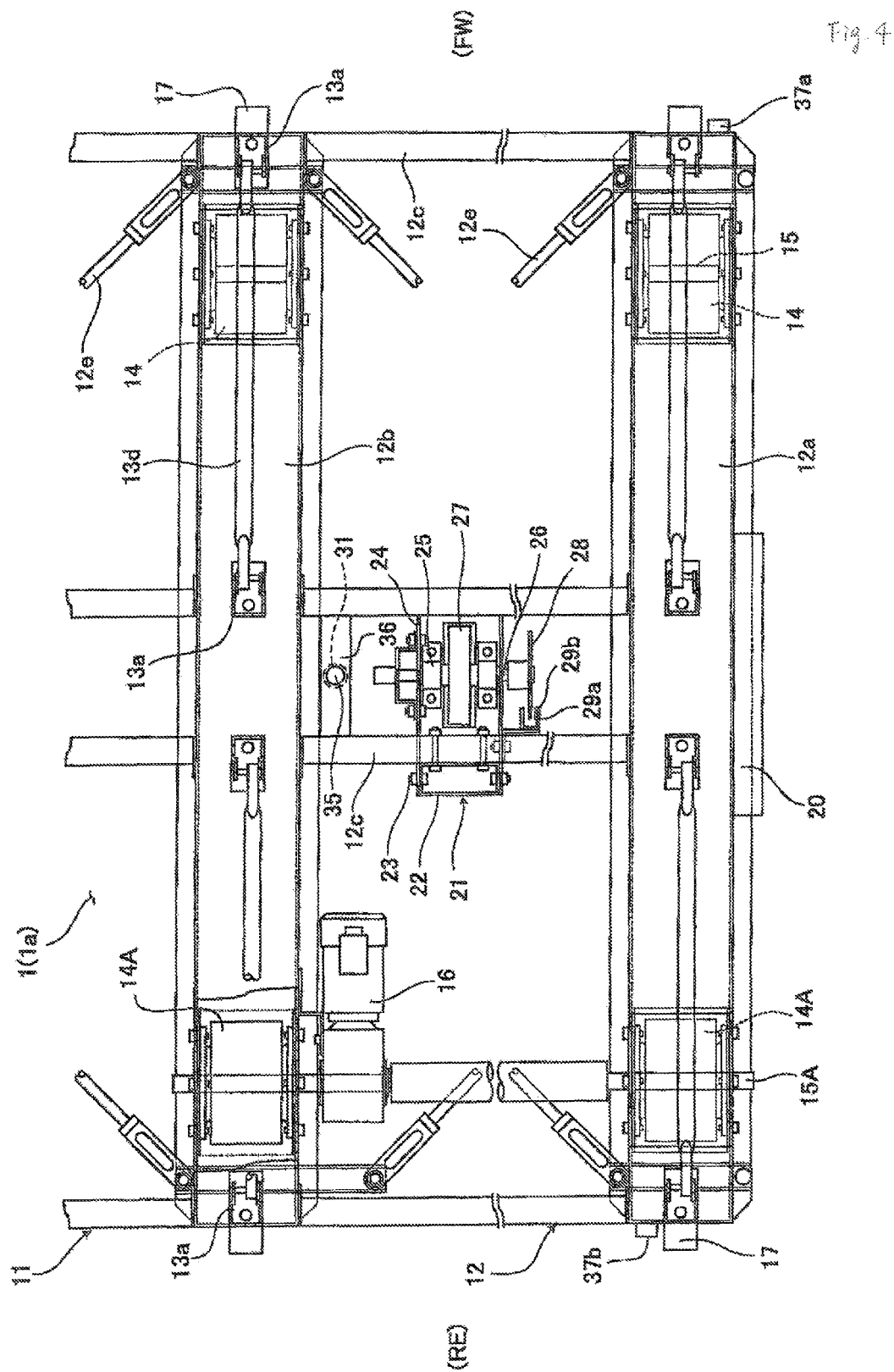
FIG. 4 is a partial cutaway plan view of an important part of a movable rack in the movable rack system.
Figure 5:
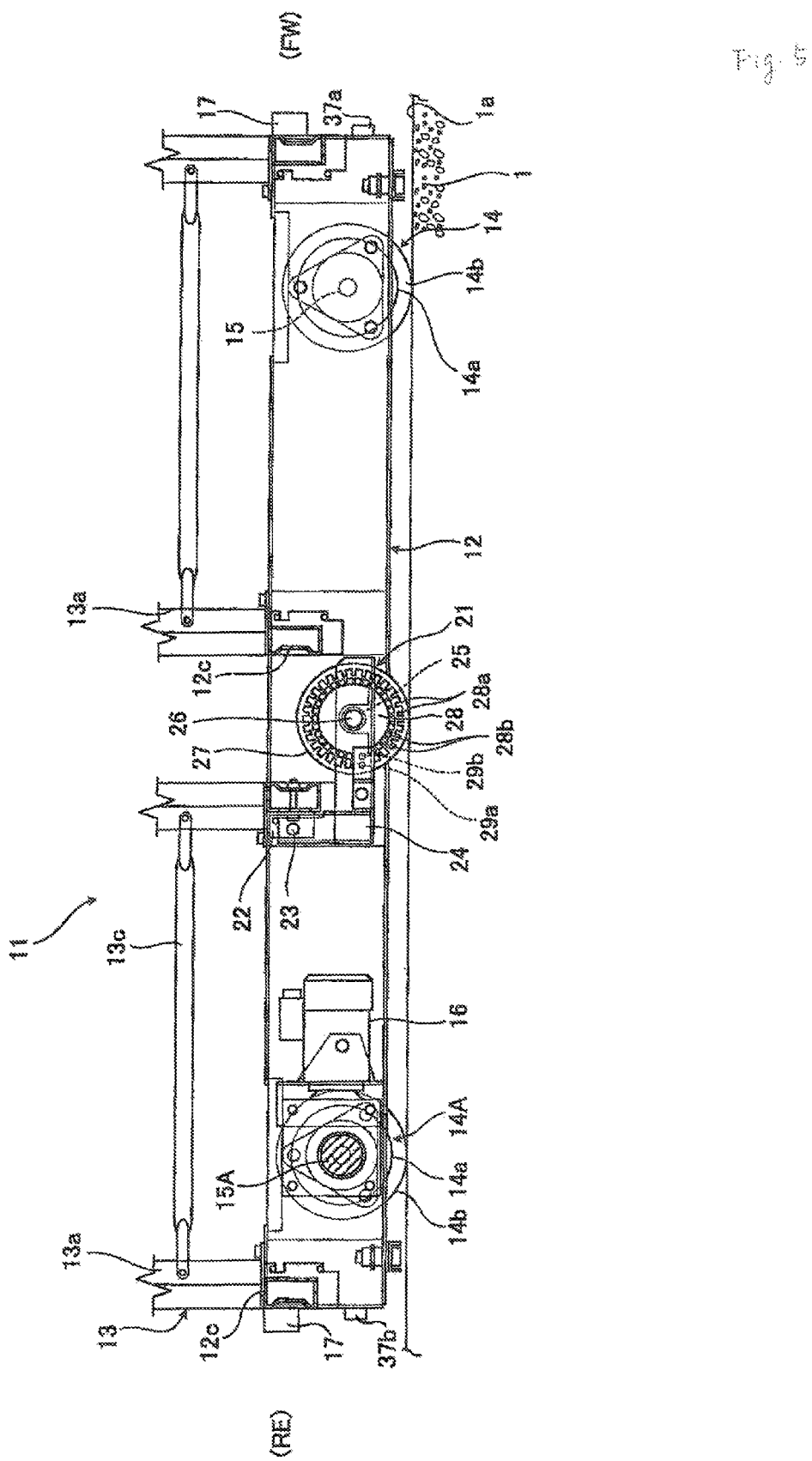
FIG. 5 is a longitudinal sectional side view of the part of a rotation driving device and a travel distance measuring device of the movable rack in the movable rack system.
Figure 6:
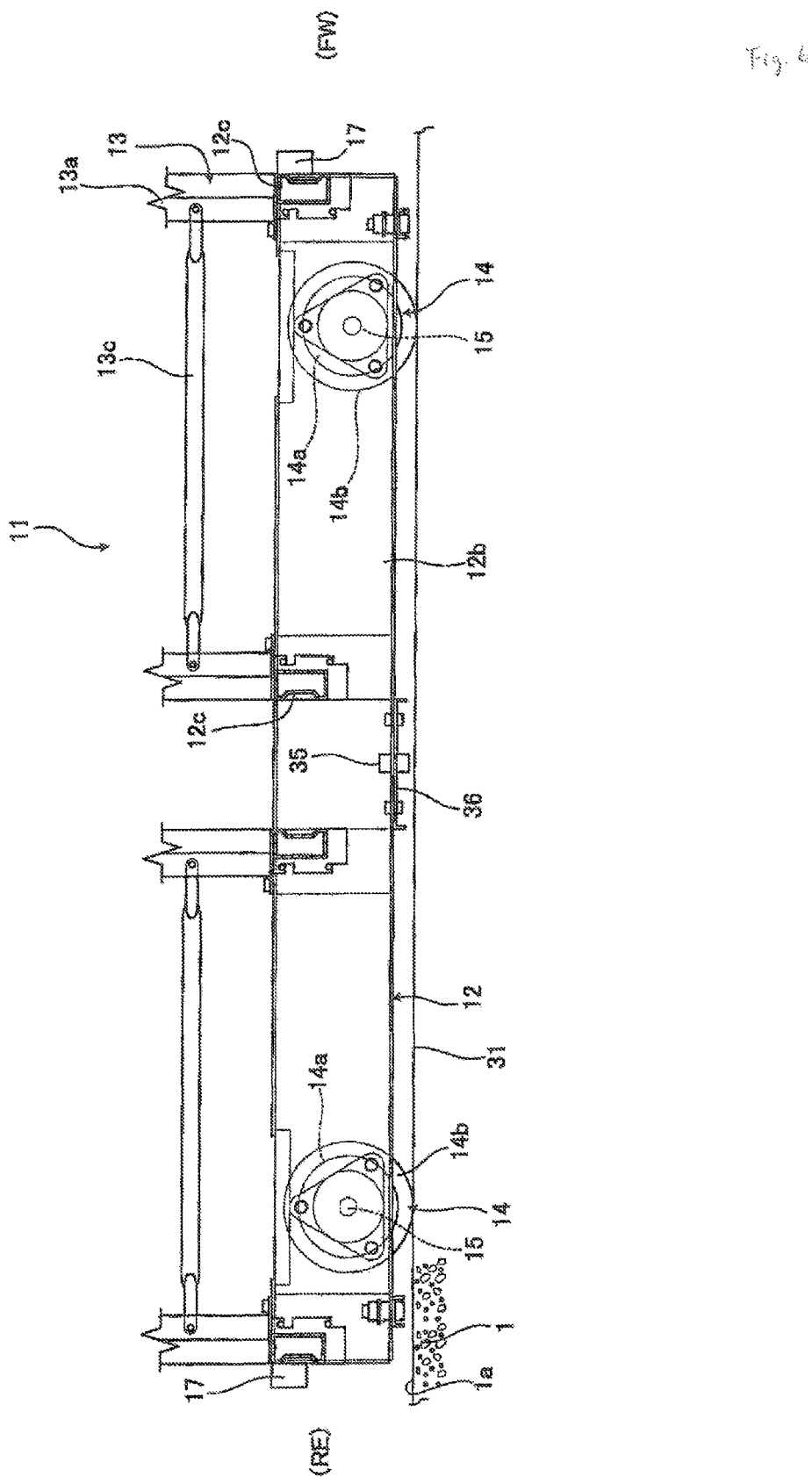
FIG. 6 is a longitudinal sectional side view of the part of a widthwise shift detection means of the movable rack in the movable rack system.
Figure 7:
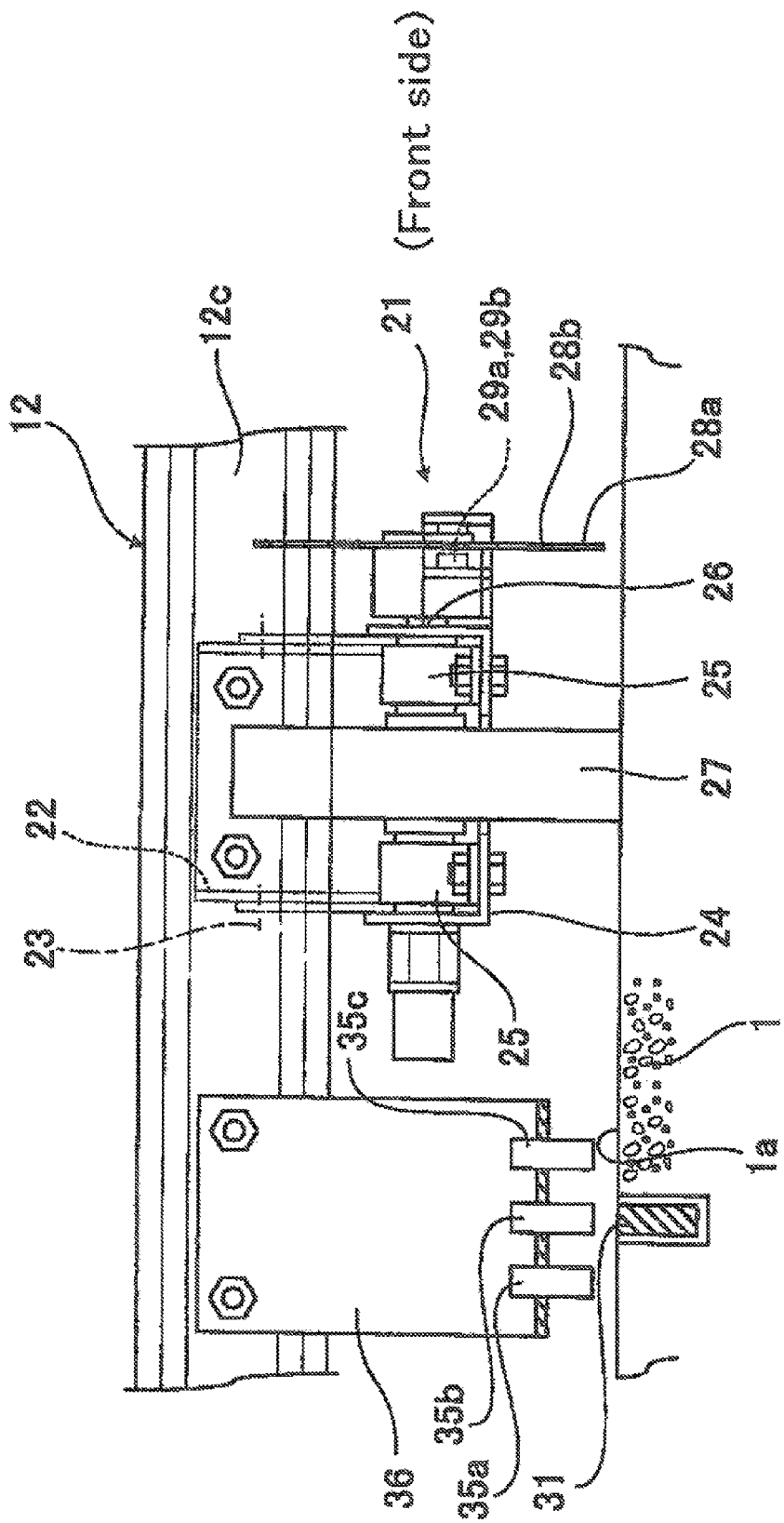
FIG. 7 is a longitudinal sectional front view of the part of the travel distance measuring device and the widthwise shift detection means of the movable rack in the movable rack system.
Figure 8:
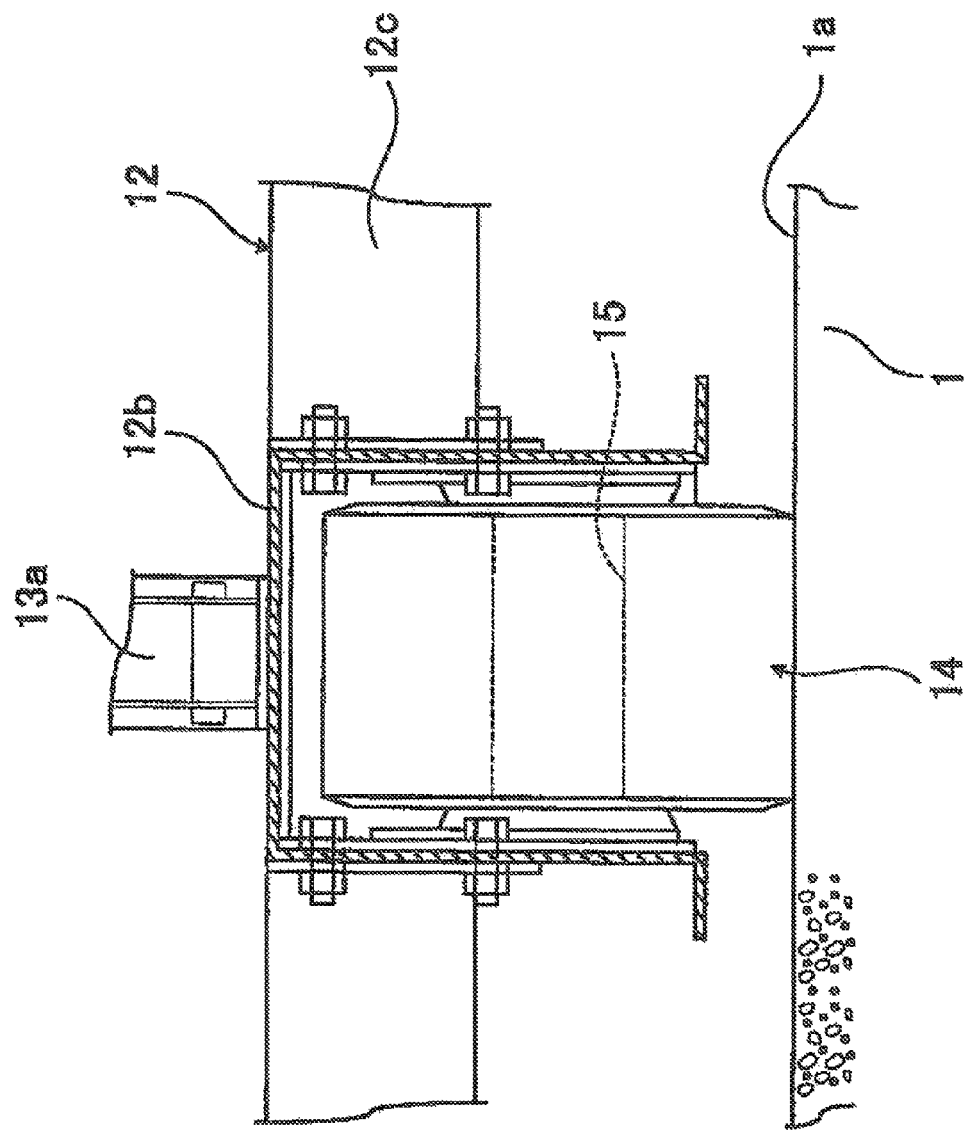
FIG. 8 is a longitudinal sectional front view of a travel wheel of the movable rack in the movable rack system.
Figure 9:
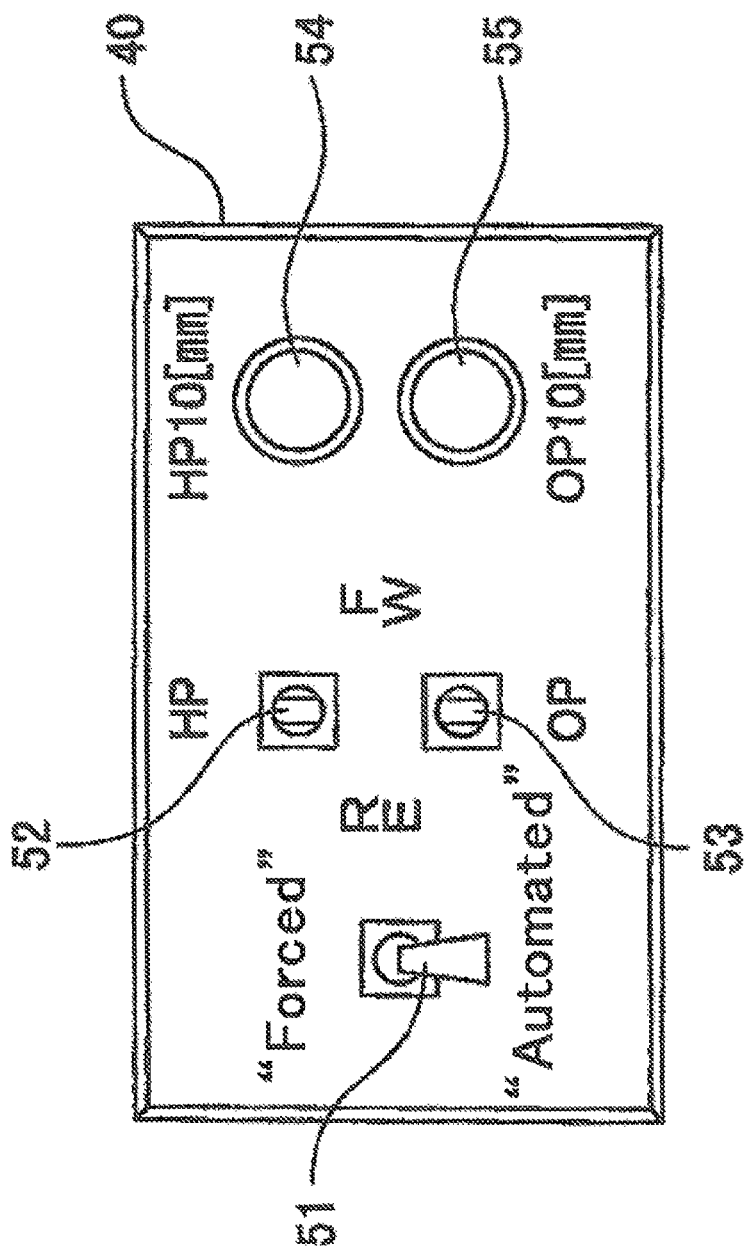
FIG. 9 is an arrangement plan of switches of an operation panel of the movable rack in the movable rack system.
Figure 10:
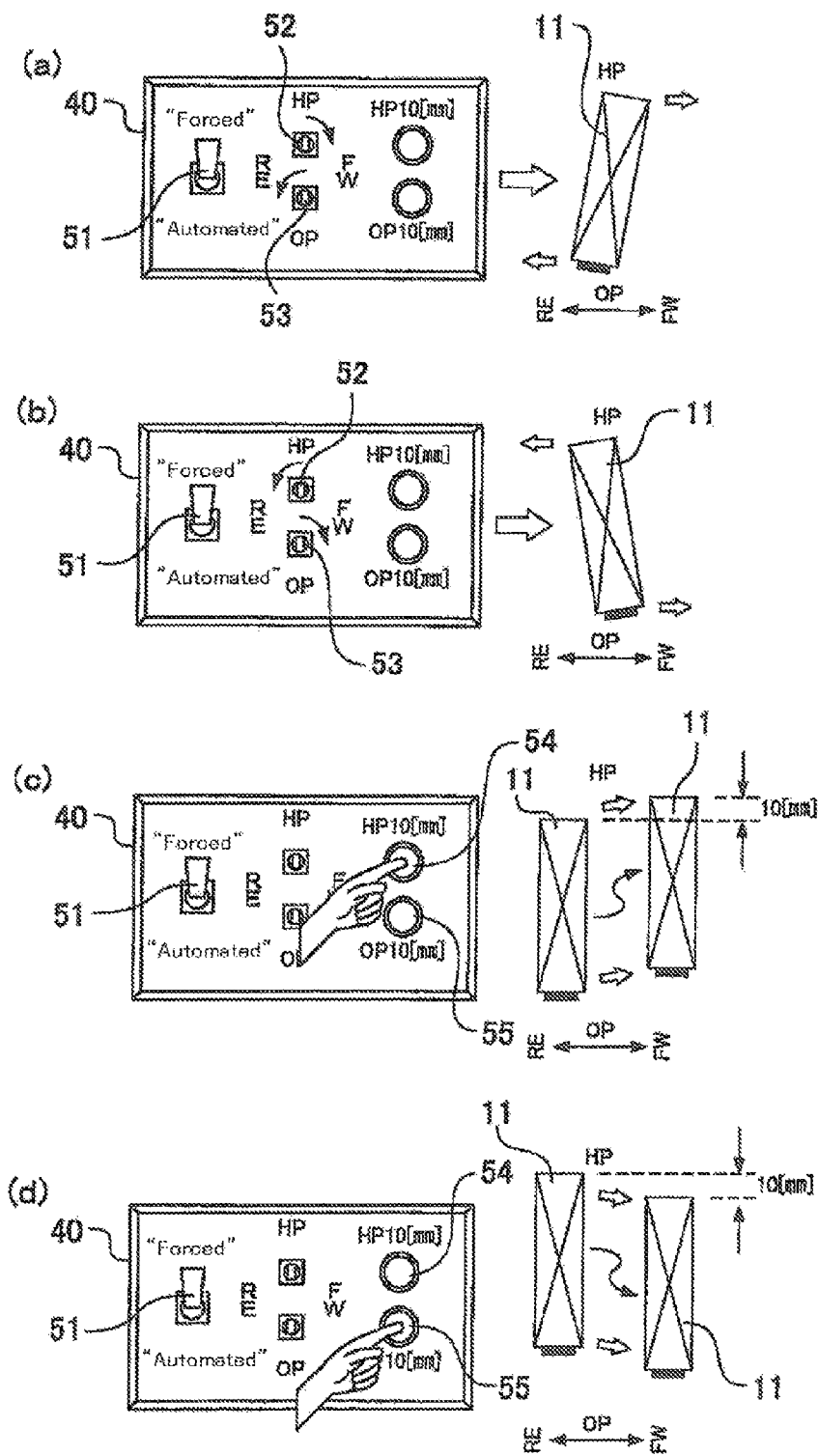
FIG. 10 is illustrations describing function of the switches on the operation panel of the movable rack in the movable rack system.
Figure 11:
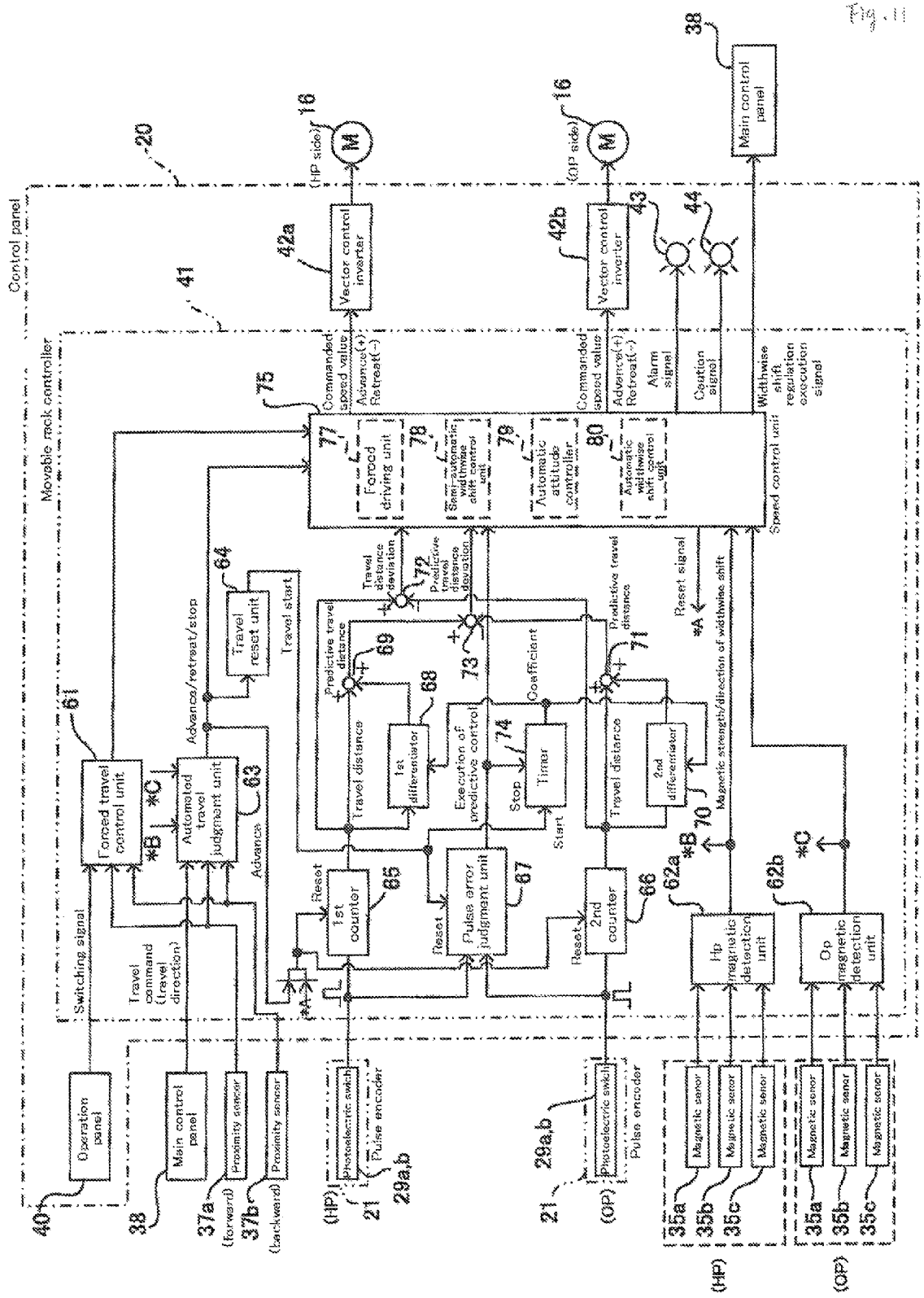
FIG. 11 is a block diagram of controlling of the movable rack in the movable rack system.
Figure 12:
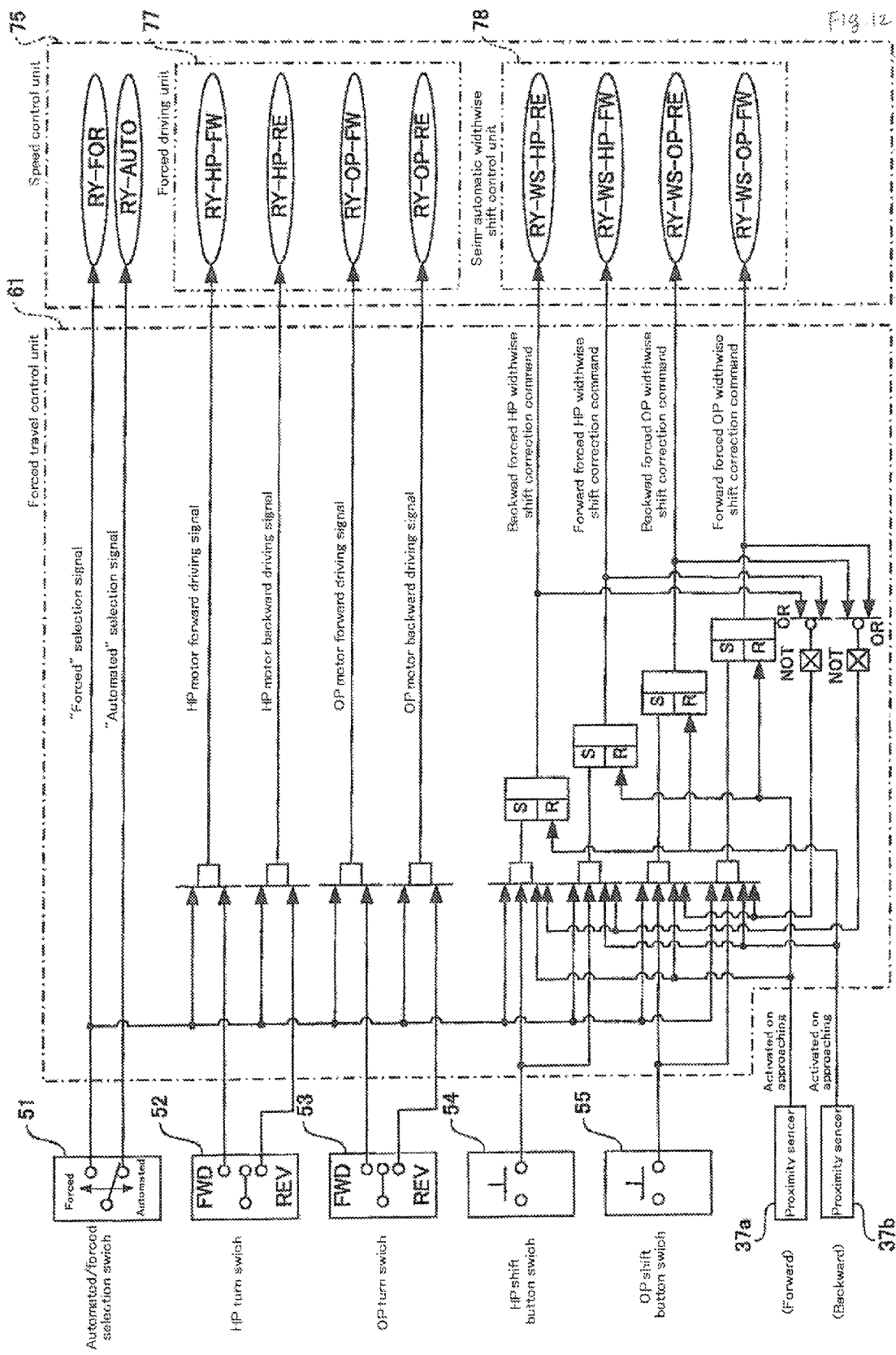
FIG. 12 is a block diagram of a forced travel control unit of a movable rack controller in the movable rack system.
Figure 13:
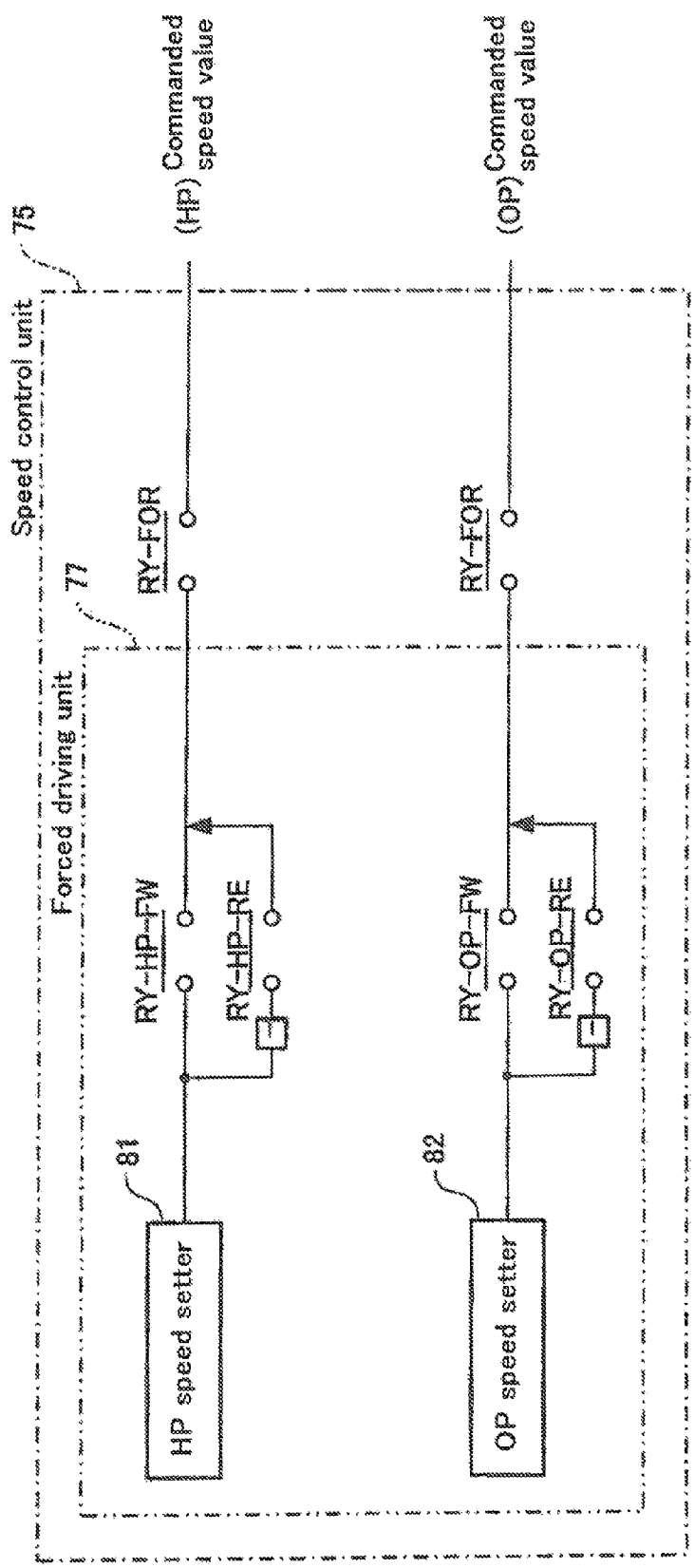
FIG. 13 is a block diagram of a forced driving unit of the movable rack controller in the movable rack system.
Figure 14:
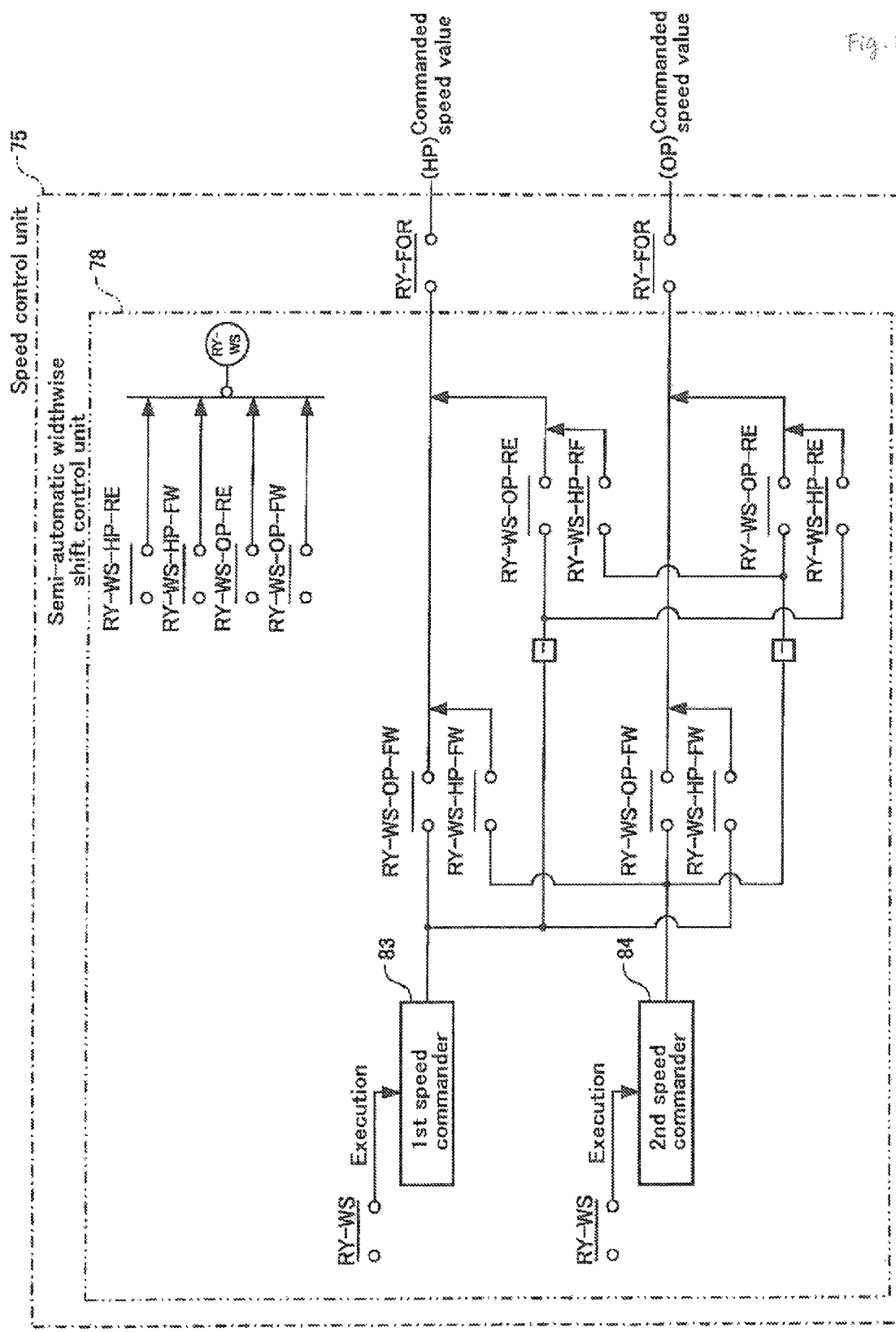
FIG. 14 is a block diagram of a semi-automatic widthwise shift control unit of the movable rack controller in the movable rack system.
Figure 15:
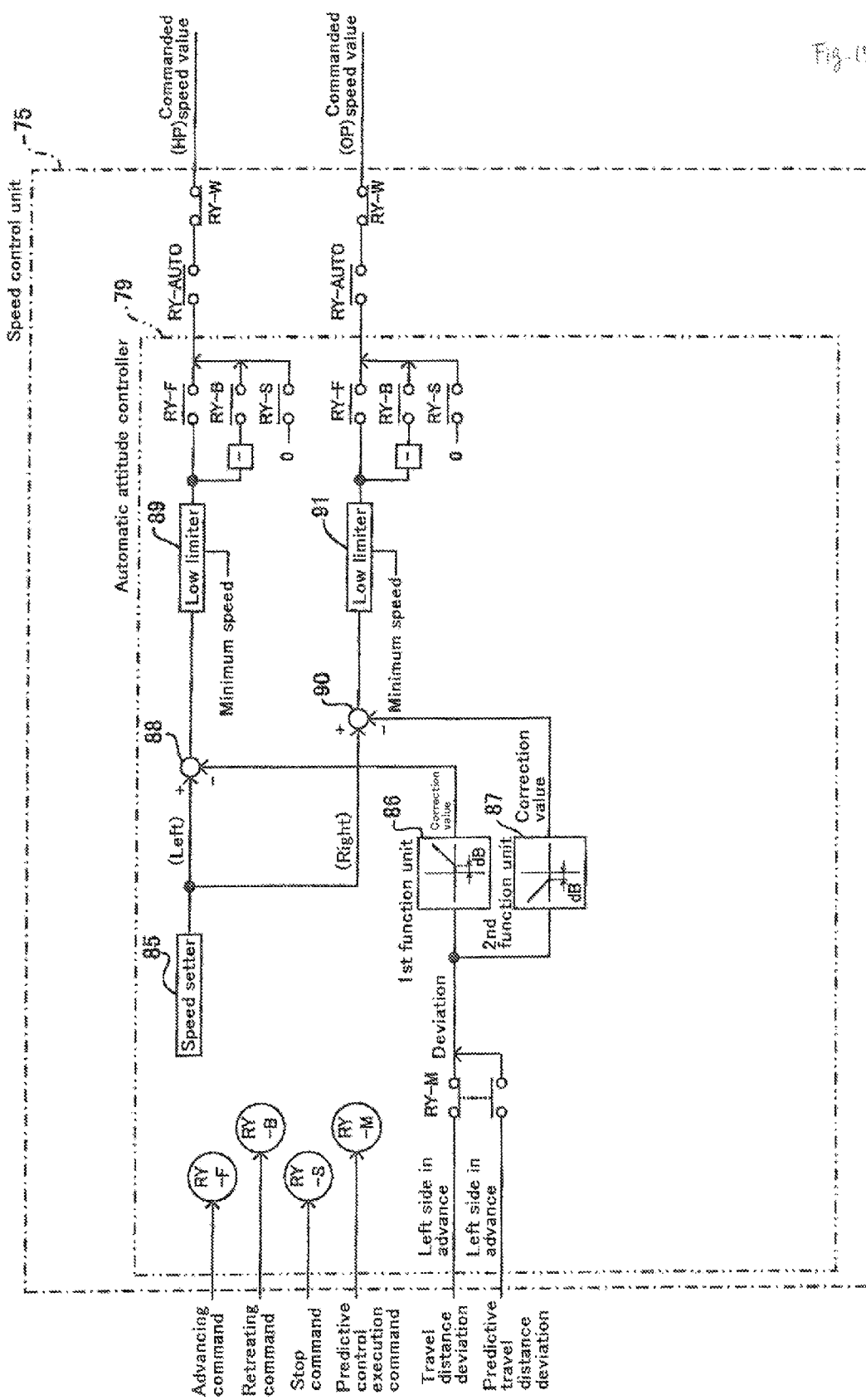
FIG. 15 is a block diagram of an automatic attitude controller of the movable rack controller in the movable rack system.
Figure 16:
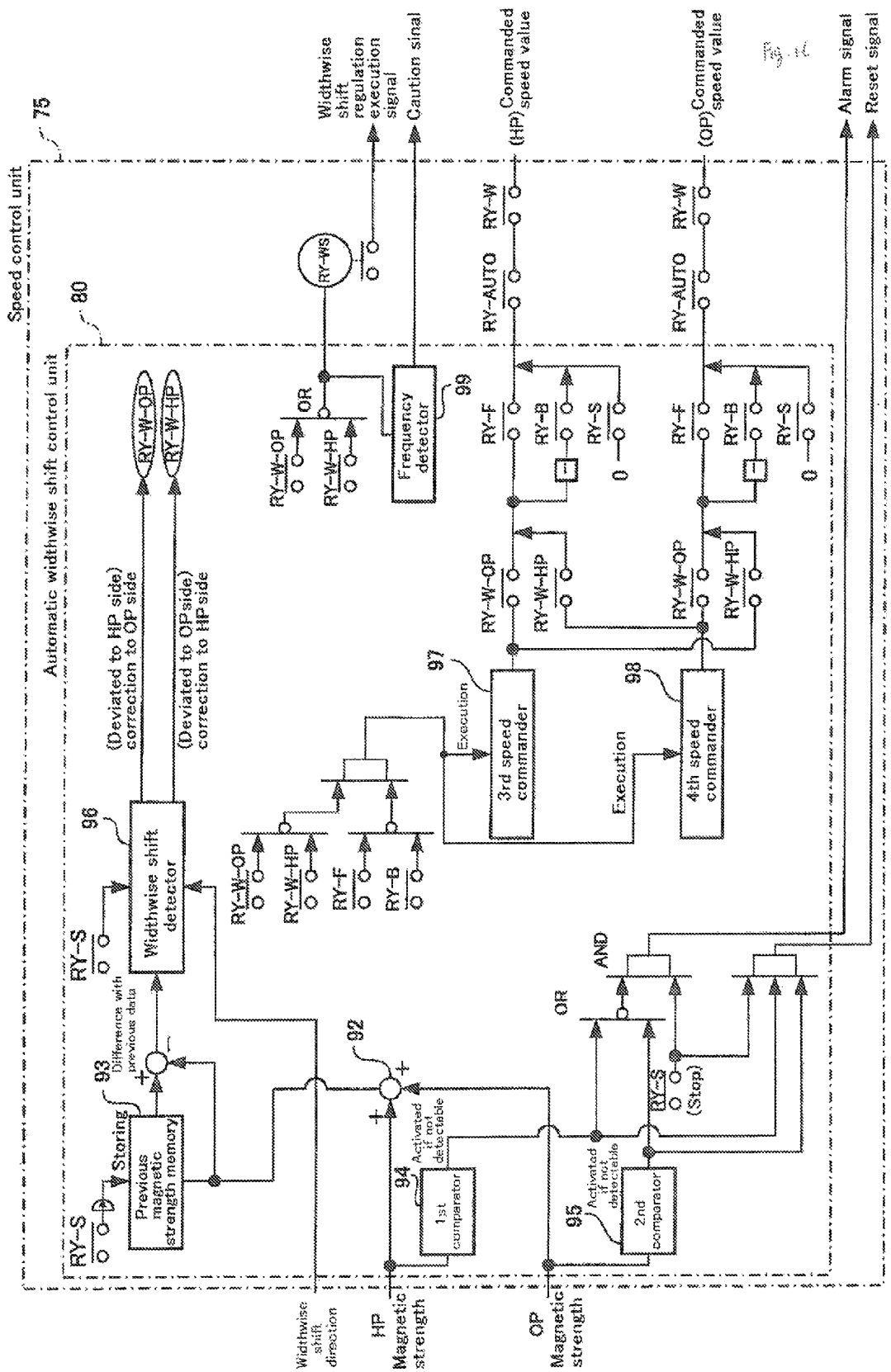
FIG. 16 is a block diagram of an automatic widthwise shift control unit of the movable rack controller in the movable rack system.

1 floor
3 stationary rack
4 lower frame unit
5 rack unit
5a storage compartment
10 travel path
11 movable rack
12 lower frame unit
13 rack unit
13e storage compartment
14 travel wheel (travel support device)
14A driven travel wheel (driven travel support device)
15 wheel shaft
15A drive wheel shaft
16 driving motor (rotation driving device)
20 control panel (control means)
21 pulse encoder (travel amount detection means)
31 magnet (member to be detected)
35 magnetic sensor (widthwise shift detection means)
37a, 37b proximity sensor
38 main control panel
40 operation panel
41 movable rack controller
42a, 42b vector control inverter
43 alarm lamp
44 caution lamp
51 automated/forced selection switch
52 HP turn switch
53 OP turn switch
54 HP shift button switch
55 OP shift button switch
61 forced travel control unit
62a HP magnetic detection unit
62b OP magnetic detection unit
63 automated travel judgment unit
67 pulse error judgment unit
75 speed control unit
77 forced driving unit
78 semi-automatic widthwise shift control unit
79 automatic attitude controller
80 automatic widthwise shift control unit
81 HP speed setter
82 OP speed setter
83 1st speed commander
84 2nd speed commander
96 widthwise shift detector
97 3rd speed commander
98 4th speed commander
99 frequency detector
A travel direction (fore and aft direction)
B transverse direction (left and right direction)
S work corridor

What is claimed is:

1. A movable rack system comprising a plurality of movable racks that can travel freely back and forth on a travel path by means of wheels, where wheels located at both sides in the transverse direction of the travel path are respectively provided with driving motors constituting driven travel wheels, and a control means controls travel of the movable rack by driving the respective driving motors of the movable rack, the system comprising;

members to be detected being provided on a floor surface at stop positions of the respective movable racks; and widthwise shift detection means for detecting a widthwise shift of the movable rack from the travel path in the left and right direction perpendicular to the travel path direction by detecting said members to be detected being provided on the respective movable racks;

wherein the control means detects a widthwise shift by the widthwise shift detection means when the movable rack stops; if the detected widthwise shift exceeds a pre-determined value, the control means determines a travel route for the movable rack to reduce the widthwise shift, and controls rotation speeds of the respective driving motors so that the movable rack follows the travel route at the next travel thereof.

2. The movable rack system according to claim 1, wherein when a movable rack travels according to the travel route reducing the widthwise shift, the control means controls the start of the travel of another movable rack to be delayed for a pre-determined time period.

3. The movable rack system according to claim 1, wherein the travel route is so configured that both the driving motors are initiated above a pre-determined rotation speed and driven thereafter at differentiated rotation speeds to eliminate the widthwise shift by a travel of the movable rack over a pre-determined distance.

4. The movable rack system according to claim 1, wherein the travel route is so configured that both the driving motors are initiated above a pre-determined rotation speed and driven thereafter at differentiated rotation speeds to eliminate the widthwise shift by plural travels of the movable rack.

5. The movable rack system according to claim 1, wherein the control means determines the frequency or the number of executions of the travels reducing the widthwise shift, and if the frequency exceeds a pre-determined frequency, or if the number exceeds a pre-determined number, the control means issues an alarm.

6. The movable rack system according to claim 1, wherein magnets are disposed as the members to be detected at respective forward and backward stop positions of the respective movable racks that move along the travel path and stop there;
   wherein magnetic sensors as the widthwise shift detection means are equipped so as to face the magnets; and
   wherein the control means detects the widthwise shift of the movable rack from the change between the current magnetic intensity detected by the magnetic sensors and the previous magnetic intensity detected by the magnetic sensors when the movable rack stops to travel, and executes a travel control for the movable rack to reduce the widthwise shift thereof.

7. The movable rack system according to claim 1, wherein the respective movable racks are provided with travel distance measuring means for detecting travel distances of the respective driven travel wheels at both the sides; and
   wherein the control means conducts an attitude correction control for the movable rack by controlling the driving rotation speeds of the respective driving motors to eliminate the difference in the travel distances of both the driven travel wheels based on the travel deviation of the driven travel wheels detected by the travel distance measuring means.

\* \* \* \* \*